US012710575B2

(12) United States Patent
Tai et al.

(10) Patent No.: US 12,710,575 B2
(45) Date of Patent: Aug. 18, 2026

(54) SENSING STRUCTURE, SENSING CHIP INCLUDING THE SAME, AND METHOD FOR FORMING THE SAME

(71) Applicant: VisEra Technologies Company Limited, Hsin-Chu City (TW)

(72) Inventors: Yi-Hsin Tai, Hsin-Chu City (TW); Hsin-Yi Hsieh, Hsin-Chu City (TW); Chin-Chuan Hsieh, Hsin-Chu City (TW)

(73) Assignee: VisEra Technologies Company Limited, Hsin-Chu City (TW)

( * ) Notice: Subject to any disclaimer, the term of this patent is extended or adjusted under 35 U.S.C. 154(b) by 152 days.

(21) Appl. No.: 18/606,454

(22) Filed: Mar. 15, 2024

(65) Prior Publication Data

US 2025/0291097 A1 Sep. 18, 2025

(51) Int. Cl.

| | |
|---|---|
| ***G02B 5/30*** | (2006.01) |
| ***G01N 21/552*** | (2014.01) |
| ***G02B 5/20*** | (2006.01) |

(52) U.S. Cl.

CPC ......... *G02B 5/3025* (2013.01); *G01N 21/553* (2013.01); *G02B 5/201* (2013.01); *G01N 2201/0683* (2013.01)

(58) Field of Classification Search

CPC .... G02B 5/201; G02B 5/3025; G01N 21/553; G01N 2201/0683

See application file for complete search history.

(56) References Cited

U.S. PATENT DOCUMENTS

| | | | | |
|---|---|---|---|---|
| 2012/0075634 | A1 | 3/2012 | Sieben-Xu et al. | |
| 2013/0323858 | A1 | 12/2013 | Abdulhalim | |
| 2015/0212003 | A1 * | 7/2015 | Shibayama .......... | G01N 21/658 356/244 |

FOREIGN PATENT DOCUMENTS

| | | | |
|---|---|---|---|
| CN | 101261227 | A | 9/2008 |
| CN | 103649724 | A | 3/2014 |
| CN | 104792739 | A | 7/2015 |

* cited by examiner

*Primary Examiner* — Thanh Luu

(74) *Attorney, Agent, or Firm* — MUNCY, GEISSLER, OLDS & LOWE, P.C.

(57) ABSTRACT

A sensing structure, a sensing chip including the sensing structure, and method for forming the sensing structure are provided. The sensing structure includes a substrate and a metal layer. The substrate has a first recess. The metal layer is disposed on the substrate. The metal layer includes a first portion and a second portion. The first portion is disposed on a top surface of the substrate. The second portion is disposed in the first recess. The second portion includes a base portion and a protruding portion disposed on the base portion and extending away from the substrate. A gap is between the first portion and the protruding portion and surrounds the protruding portion, and the gap is in a range of 20 nm to 100 nm.

13 Claims, 16 Drawing Sheets

13
10
12
G
18a
P1
H1
W1
W2

D3
D1
D2
1
20
18a
18b
18b
18a
11
G
18b
10
P1
H1
W1
W2

D3
D1
D2

13
10
12
16
18a
18a
14
12
10
14B
P1
H1
W1
W2

D3
D1
D2
18a
11
10
P1
H1
W1
W2

D3
D1
D2

SENSING STRUCTURE, SENSING CHIP INCLUDING THE SAME, AND METHOD FOR FORMING THE SAME

BACKGROUND OF THE INVENTION

Field of the Invention

The present invention is related to a sensing structure, a sensing chip including the sensing structure, and a method for forming the sensing structure, and, in particular, it related to a sensing structure with specific dimensions, a sensing chip including the sensing structure, and a method for forming the sensing structure.

Description of the Related Art

Sensing structures such as surface plasmon resonance (SPR) structures are widely used to sense and detect analytes. For example, a sensing structure is provided with ligands that can be combined with the analyte to be sensed. Then, since the characteristic peaks of the sensing structure before and after being combined with the analyte are different, the analyte can be detected by measuring the amount of wavelength shift.

However, the sensitivities of those sensing structures are still insufficient. Although existing sensing structures have been adequate for their intended purposes, they have not been entirely satisfactory in all respects. There are still some problems to be overcome with respect to sensing structures.

BRIEF SUMMARY OF THE INVENTION

An embodiment of the present invention provides a sensing structure. The sensing structure includes a substrate and a metal layer. The substrate has a first recess. The metal layer is disposed on the substrate. The metal layer includes a first portion and a second portion. The first portion is disposed on a top surface of the substrate. The second portion is disposed in the first recess. The second portion includes a base portion and a protruding portion disposed on the base portion and extending away from the substrate. Wherein a gap is between the first portion and the protruding portion and surrounds the protruding portion, and the gap is in a range of 20 nm to 100 nm.

An embodiment of the present invention provides a sensing chip includes a filter array, a carrier layer, a light-blocking layer, a polarizer, and the sensing structure described above.

An embodiment of the present invention provides a method for forming a sensing chip. The formation of the sensing chip includes providing a substrate structure with a trench. A mask is formed on the substrate structure. An anisotropic etching process is performed to expose a portion of a bottom surface of the trench. A first sublayer is formed on the mask and on the portion of the bottom surface of the trench. The mask is removed to expose the substrate structure. Wherein a gap is between the first sublayer and the substrate structure, and the gap is in a range of 20 nm to 100 nm.

The sensing structure and the sensing chip of the present disclosure may be applied in various types of electronic devices. In order to make the features and advantages of some embodiments of the present disclosure more understand, some embodiments of the present disclosure are listed below in conjunction with the accompanying drawings, and are described in detail as follows.

BRIEF DESCRIPTION OF THE DRAWINGS

The present disclosure can be more fully understood from the following detailed description when read in conjunction with the accompanying drawings. It should be noted that, according to the standard practice in the industry, the various features are not drawn to scale. In fact, the dimensions of the various features may be arbitrarily increased or reduced for clarity.

DETAILED DESCRIPTION OF THE INVENTION

Figure 1A:
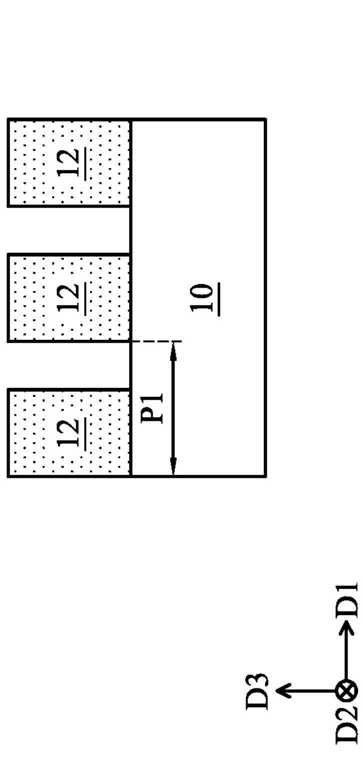
FIG. 1A to FIG. 1H are schematic cross-sectional views illustrating various stages of forming a sensing structure according to some embodiments, respectively.

Sensing structures and sensing chips of various embodiments of the present disclosure will be described in detail below. It should be understood that the following description provides many different embodiments for implementing various aspects of some embodiments of the present disclosure. The specific elements and arrangements described below are merely to clearly describe some embodiments of the present disclosure. Of course, these are only used as examples rather than limitations of the present disclosure. Furthermore, similar or corresponding reference numerals may be used in different embodiments to designate similar or corresponding elements in order to clearly describe the present disclosure. However, the use of these similar or corresponding reference numerals is only for the purpose of simply and clearly description of some embodiments of the present disclosure, and does not imply any correlation between the different embodiments or structures discussed.

It should be understood that relative terms, such as "lower", "bottom", "higher", or "top" may be used in various embodiments to describe the relative relationship of one element of the drawings to another element. It will be understood that if the device in the drawings were turned upside down, elements described on the "lower" side would become elements on the "upper" side. The embodiments of the present disclosure can be understood together with the drawings, and the drawings of the present disclosure are also regarded as a portion of the disclosure.

Furthermore, when it is mentioned that a first material layer is located on or over a second material layer, it may include the embodiment which the first material layer and the second material layer are in direct contact and the embodiment which the first material layer and the second material layer are not in direct contact with each other, that is one or more layers of other materials is between the first material layer and the second material layer. However, if the first material layer is directly on the second material layer, it means that the first material layer and the second material layer are in direct contact.

In addition, it should be understood that ordinal numbers such as "first", "second", and the like used in the description and claims are used to modify elements and are not intended to imply and represent the element(s) have any previous ordinal numbers, and do not represent the order of a certain element and another element, or the order of the manufacturing method, and the use of these ordinal numbers is only used to clearly distinguished an element with a certain name and another element with the same name. The claims and the specification may not use the same terms, for example, a first element in the specification may be a second element in the claim.

In some embodiments of the present disclosure, terms related to bonding and connection, such as "connect", "interconnect", "bond", and the like, unless otherwise defined, may refer to two structures in direct contact, or may also refer to two structures not in direct contact, that is there is another structure disposed between the two structures. Moreover, the terms related to bonding and connection can also include embodiments in which both structures are movable, or both structures are fixed.

Herein, the terms "approximately", "about", and "substantially" generally mean within 10%, within 5%, within 3%, within 2%, within 1%, or within 0.5% of a given value or range. The given value is an approximate value, that is, "approximately", "about", and "substantially" can still be implied without the specific description of "approximately", "about", and "substantially". The phrase "a range between a first value and a second value" or "in a range of a first value to a second value" means that the range includes the first value, the second value, and other values in between. Furthermore, any two values or directions used for comparison may have certain tolerance. If the first value is equal to the second value, it implies that there may be a tolerance within about 10%, within 5%, within 3%, within 2%, within 1%, or within 0.5% between the first value and the second value. If the first direction is perpendicular to the second direction, the angle between the first direction and the second direction may be between 80 degrees and 100 degrees. If the first direction is parallel to the second direction, the angle between the first direction and the second direction may be between 0 degrees and 10 degrees.

In the following description and claims, terms such as "including" and "having" are open-ended words, so they should be interpreted as meaning "including but not limited to . . . ". Therefore, when the terms "including" or "having" is used in the description of the present disclosure, it designates the presence of corresponding features, regions, steps, operations, and/or elements, but does not exclude the presence of one or more corresponding features, regions, steps, operations, and/or elements.

It should be understood that, in the following embodiments, features in several different embodiments may be replaced, recombined, and bonded to complete other embodiments without departing from the spirit of the present disclosure. The features of the various embodiments can be used in any combination as long as they do not violate the spirit of the present disclosure or conflict with each other.

Unless otherwise defined, all terms (including technical and scientific terms) used herein have the same meaning as commonly understood by a person of ordinary skills in the art. It is understood that these terms, such as those defined in commonly used dictionaries, should be interpreted as having meanings consistent with the relevant art and the background or context of the present disclosure, and should not be interpreted in an idealized or overly formal manner, unless otherwise defined in the embodiments of the present disclosure.

Herein, the respective directions are not limited to three axes of the rectangular coordinate system, such as the X-axis, the Y-axis, and the Z-axis, and may be interpreted in a broader sense. For example, the X-axis, the Y-axis, and the Z-axis may be perpendicular to each other, or may represent different directions that are not perpendicular to each other, but the present disclosure is not limited thereto. For convenience of description, hereinafter, the X-axis direction is the first direction D1 (the width direction), the Y-axis direction is the second direction D2 (the length direction), and the Z-axis direction is the third direction D3 (the height direction or the thickness direction). In some embodiments, the schematic cross-sectional views described herein are schematic views of the XZ plane, and the schematic top views described herein are schematic views of the XY plane.

In some embodiments, the terms "pitch of element(s)" or "a distance (or a pitch) between one element and another element" means that the distance is between a center of one element and a center of another element, or the distance is between the boundary of one element and the boundary of another element. The "center" of one element may be the geometric center of the element.

In some embodiments, additional components may be added to the sensing structure of the present disclosure. In some embodiments, some components of the sensing structure disclosed herein may be replaced or omitted. In some embodiments, additional processing steps may be provided before, during, and/or after a forming method of a sensing structure. In some embodiments, some of the described processing steps may be replaced or omitted, and the order of some of the described processing steps may be interchangeable. Furthermore, it should be understood that some of the described processing steps may be replaced or deleted for other embodiments of the method. Moreover, in the present disclosure, the number and dimensions of each component in the drawings are only for illustration and are not used to limit the scope of the present disclosure.

Referring to FIG. 1A to FIG. 1H, they are schematic cross-sectional views illustrating various stages of forming a sensing structure according to some embodiments, respectively. As shown in FIG. 1A, in some embodiments, a substrate 10 may be provided. In some embodiments, the substrate 10 may include silicon, silica, glass, quartz, sapphire, ceramics, polyimide (PI), polycarbonate (PC), polyethylene terephthalate (PET), polypropylene (PP), other suitable materials, or a combination thereof, but the present disclosure is not limited thereto. In some embodiments, the substrate 10 may include a transparent substrate, a semi-transparent substrate, or an opaque substrate. For example, the substrate may be silicon or silica.

As shown in FIG. 1A, in some embodiments, a patterned layer 12 may be formed on the substrate 10. In some embodiments, the patterned layer 12 may cover a portion of the substrate 10 and expose the remaining portion of the substrate 10. In some embodiments, the patterned layer 12 may include photoresist material, metal, other suitable material which can be removed in the sequent processes, but the present disclosures is not limited thereto. In some embodiments, when the patterned layer 12 includes photoresist material, the photoresist material may include organic materials, but the present disclosure is not limited thereto. In some embodiments, the patterned layer 12 may be formed by a deposition process. For example, the deposition process may include a chemical vapor deposition (CVD) process, a physical vapor deposition (PVD) process, a sputtering process, other suitable deposition processes, or a combination thereof, but the present disclosure is not limited thereto. In some embodiments, the patterned layer 12 may include a plurality of (photoresist, metal, or other kinds of material of) patterns. In some embodiments, a first pitch P1 of the patterned layer 12 represents a distance between the boundary (for example, the left boundary) of a first pattern to the boundary (for example, the left boundary) of a second pattern, wherein the second pattern is adjacent to the first pattern and there is no other pattern disposed therebetween.

Figure 1B:
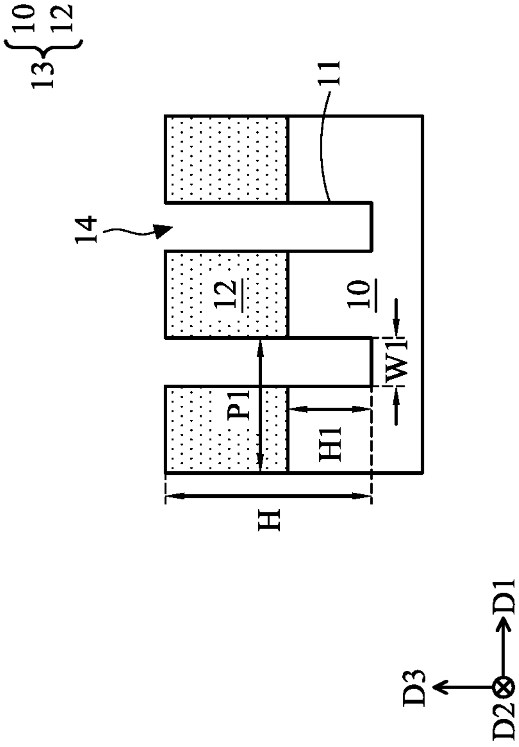

As shown in FIG. 1B, in some embodiments, the substrate 10 may be etched by using the patterned layer 12 as an etching mask to form recesses 11 in the substrate 10. In some embodiments, the recess 11 may have a first width W1 in the first direction D1 and have a first height H1 in the third direction D3. Therefore, the width of the base portion described below may be adjusted to match the first width W1.

In some embodiments, the etched substrate 10 and the patterned layer 12 disposed on the etched substrate 10 may be collectively referred to as a substrate structure 13. In some embodiments, the substrate structure 13 may have a trench 14 with a height H in the first direction D1. Since the recess 11 may be referred to as a portion of the trench 14, the trench 14 may have the first width W1 in the first direction D1. In some embodiments, the ratio of the height H of the trench 14 to the first width W1 of the trench 14 (height H/first width W1) may be greater than 1. For example, the ratio of height H to first width W1 may be 1.1, 1.2, 1.3, 1.5, 2, 2.5, 3, 3.5, 4, 4.5, 5, or any value or any range of values between the aforementioned values. Therefore, the trench 14 may have a high aspect ratio, thereby sequent forming the gap with the specific dimension.

In other embodiments, the patterned layer 12 may be replaced by or combined with any raising material which may increase the ratio of height H to first width W1. That is, the raising material may replace or combine with the patterned layer 12 and dispose on the substrate 10. In other embodiments, the height (not shown) of the patterned layer 12 may be equal to or greater than 0 and less than or equal to the height H. Therefore, dimensions of the gap described below may be adjusted according to the ratio of height H to first width W1.

Figure 1C:
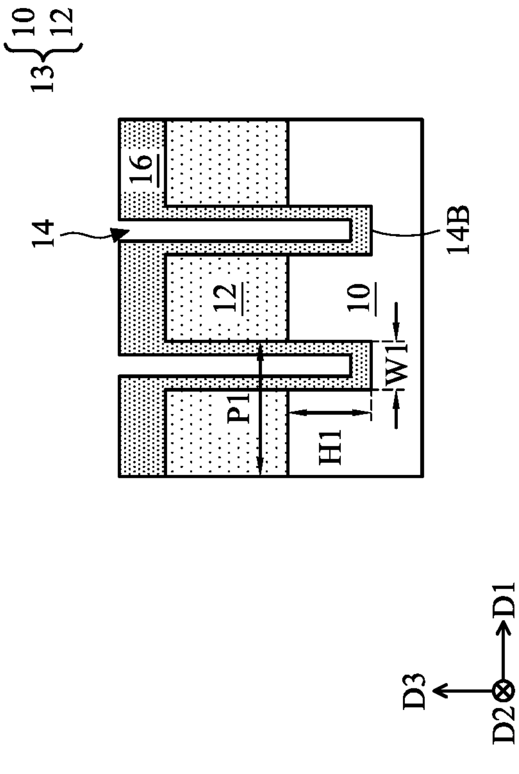

As shown in FIG. 1C, in some embodiments, a mask 16 may be formed on the substrate structure 13. In some embodiments, the mask 16 may be conformally formed on the top surface of the substrate structure 13. The mask 16 may include metal oxide such as aluminum oxide ($Al_2O_3$), but the present disclosure is not limited thereto. In some embodiments, the mask 16 may be formed by the deposition process. Since the trench 14 has high aspect ratio (that is, the height H/the first width W1), in the third direction D3, a thickness (not shown) of the mask 16 on the patterned layer 12 is greater than a thickness (not shown) of the mask 16 on the bottom surface 14B of the trench 14.

Figure 1D:
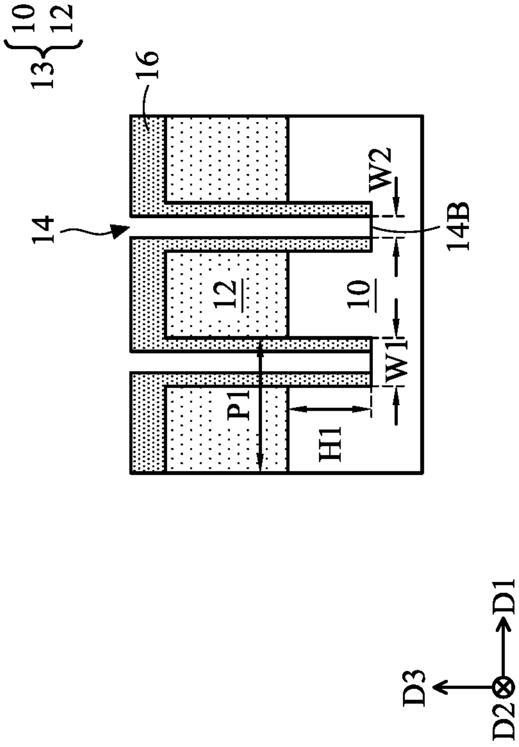

As shown in FIG. 1D, in some embodiments, an anisotropic etching process may be performed to expose a portion of the bottom surface 14B of the trench 14. In some embodiments, after the anisotropic etching process, the mask 16 on the patterned layer 12 may be thinned and the mask 16 on the bottom surface 14B of the trench 14 may be partially removed. In some embodiments, after the anisotropic etching process, a portion of the bottom surface 14B of the trench 14 may be exposed and the remaining portion of the bottom surface 14B of the trench 14 may be covered with the patterned layer 16. For example, a center portion of the bottom surface 14B of the trench 14 may be exposed, and a peripheral portion of the bottom surface 14B of the trench 14 may be covered. In some embodiments, the exposed portion of the bottom surface 14B has a second width W2 in the first direction D1. Therefore, the width of the protruding portion described below may be adjusted to match the second width W2.

Figure 1F:
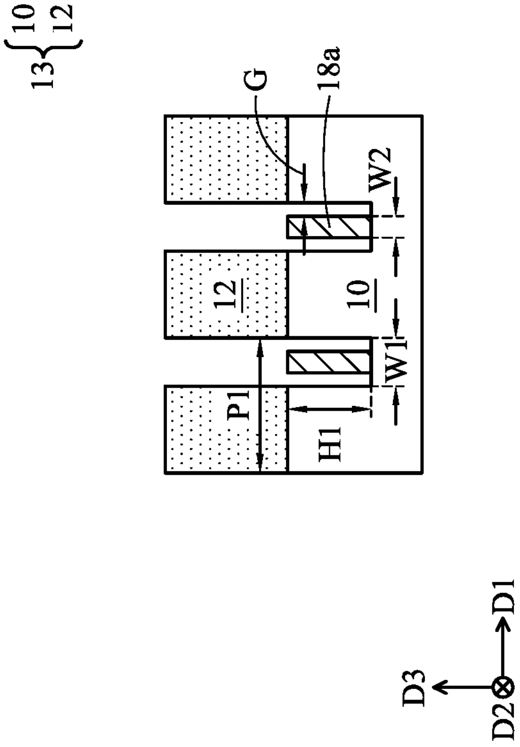
Figure 1H:
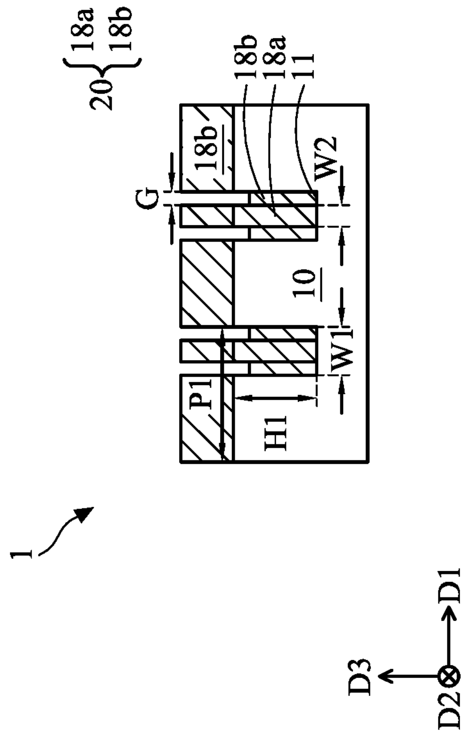
Figure 1E:
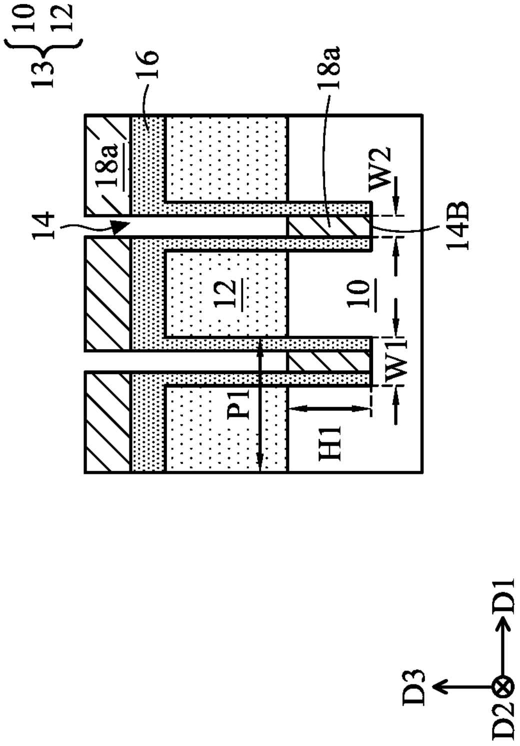

As shown in FIG. 1E, in some embodiments, a first sublayer **18*a* may be formed on the mask 16 and on the portion of the bottom surface 14B of the trench 14. The first sublayer 18*a* may expose a sidewall of the mask 16. In some embodiments, the material of the first sublayer 18*a* may be filled in the trench 14. In some embodiments, the first sublayer 18*a* may include gold (Au), silver (Ag), aluminum (Al), or other material generating surface plasmon resonance (SPR) signal, but the present disclosure is not limited thereto. For example, the first sublayer 18*a* may include gold. In some embodiments, the first sublayer 18*a*** may be formed by a deposition process.

As shown in FIG. 1F, in some embodiments, the mask 16 may be removed to expose the substrate structure 13. In some embodiments, the mask 16 and the first sublayer **18*a* on the mask 16 may be removed together. In some embodiments, the mask 16 may be removed by wet etching process or other suitable process. In some embodiments, the gap G may be between the first sublayer 18*a* and the exposed substrate structure 13 in the first direction D1**, and the gap G may be in a range of 20 nm to 100 nm. For example, the gap G may be 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, or any value or any range of values between the aforementioned values. Accordingly, the sensitivity of the sensing structure of the present disclosure may be improved.

Figure 1G:
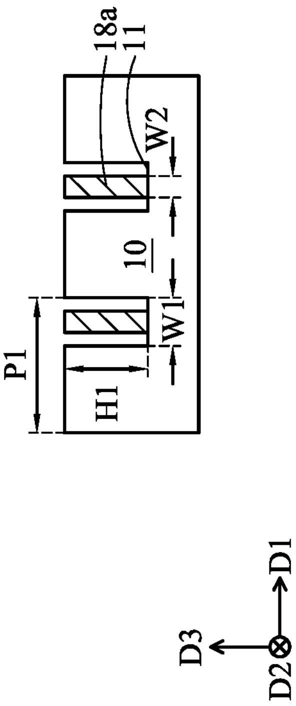

As shown in FIG. 1G, in some embodiments, after the removal of the mask 16, the patterned layer 12 may be removed. In some embodiments, the patterned layer 12 may be removed by ashing process or other suitable process.

As shown in FIG. 1H, in some embodiments, a second sublayer 18*b* may be formed on the first sublayer 18*a* and on the substrate 10 to obtain a sensing structure 1. In some embodiments, materials and formation methods of the second sublayer 18*b* may be different or the same as materials and formation methods of the first sublayer 18*a*. For example, the second sublayer 18*b* may include gold. In some embodiments, the gap G may be between the second sublayer 18*b* on the first sublayer 18*a* and the second sublayer 18*b* on the substrate 10.

In the following, the same or similar reference numerals represent the same or similar elements, and repeated descriptions are omitted. Further, other embodiments of substrate structures or sensing structures may be described below.

Figure 2B:
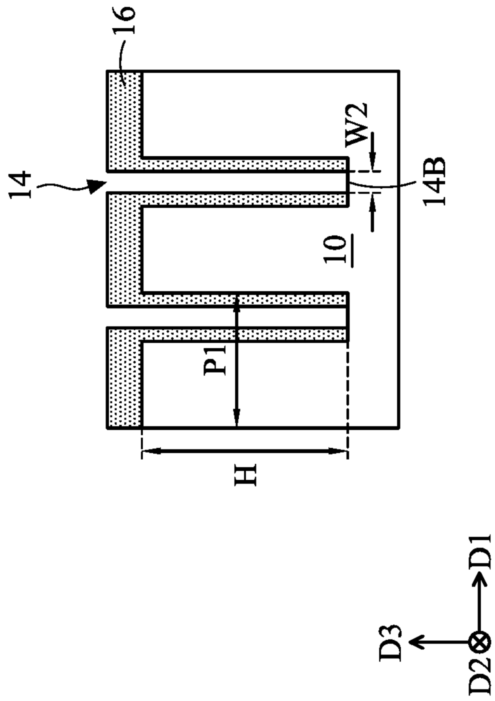
FIG. 2A and FIG. 2B are schematic cross-sectional views illustrating various stages of forming a sensing structure according to some embodiments, respectively.
Figure 2A:
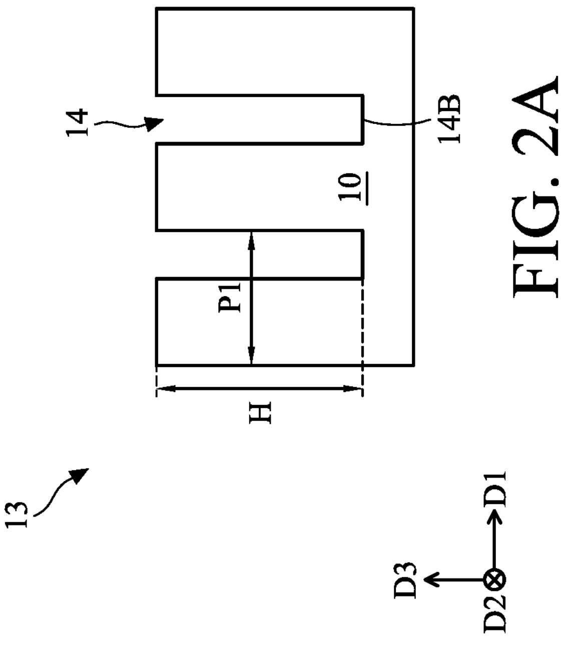

Referring to FIG. 2A and FIG. 2B, they are schematic cross-sectional views illustrating various stages of forming a sensing structure according to some embodiments, respectively. As shown in FIG. 2A, in some embodiments, the substrate structure 13 may be a substrate 10 with a trench 14. In some embodiment, there is not patterned layer 12 on the substrate 10, that is the height of the patterned layer 12 is zero. As shown in FIG. 2B, in some embodiments, the mask 16 may be conformally formed on the substrate 10. In some embodiment, an anisotropic etching process may be performed to expose a portion of the bottom surface 14B of the trench 14. In some embodiment, after performing the process as shown in FIG. 2B, some of the processes as shown in FIG. 1E to FIG. 1H may be continually performed.

Figure 3B:
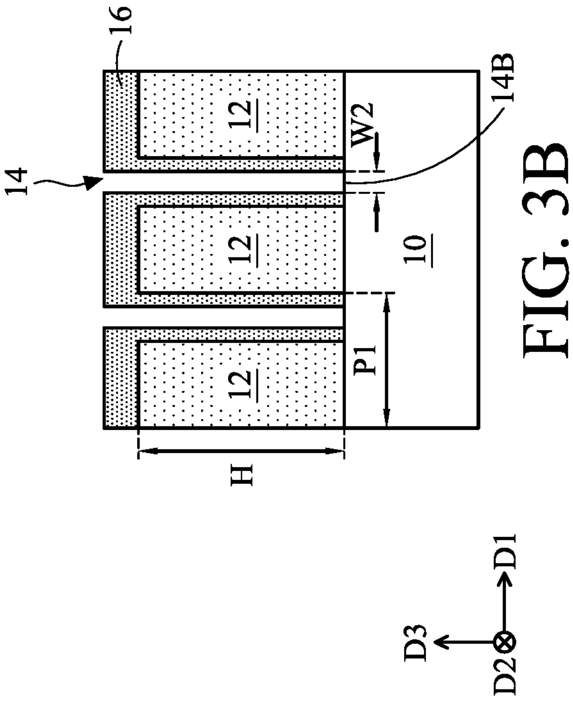
FIG. 3A and FIG. 3B are schematic cross-sectional views illustrating various stages of forming a sensing structure according to some embodiments, respectively.
Figure 3A:
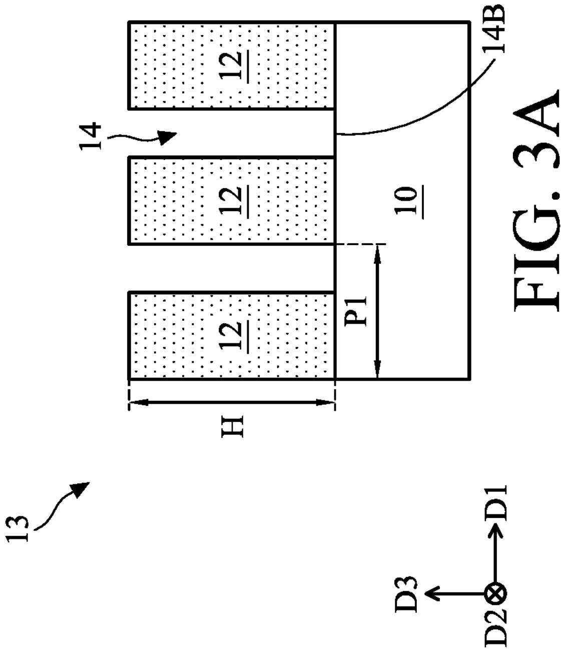

Referring to FIG. 3A and FIG. 3B, they are schematic cross-sectional views illustrating various stages of forming a sensing structure according to some embodiments, respectively. As shown in FIG. 3A, in some embodiments, the substrate structure 13 may include a substrate 10 without recess and the patterned layer 12 disposed on the substrate 10. As shown in FIG. 3B, in some embodiments, the mask 16 may be conformally formed on the substrate 10 and the patterned layer 12. In some embodiment, an anisotropic etching process may be performed to expose a portion of the bottom surface 14B of the trench 14. In some embodiment, after performing the process as shown in FIG. 3B, some of the processes as shown in FIG. 1E to FIG. 1H may be continually performed.

Figure 4B:
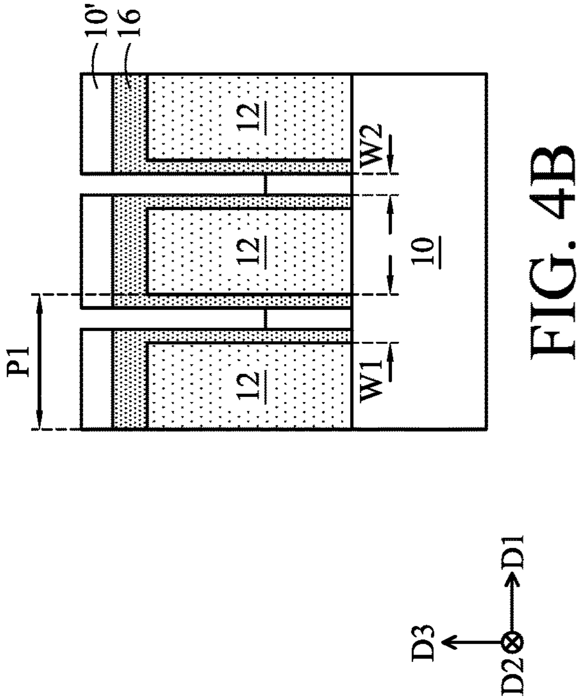
FIG. 4A to FIG. 4E are schematic cross-sectional views illustrating various stages of forming a sensing structure according to some embodiments, respectively.
Figure 4C:
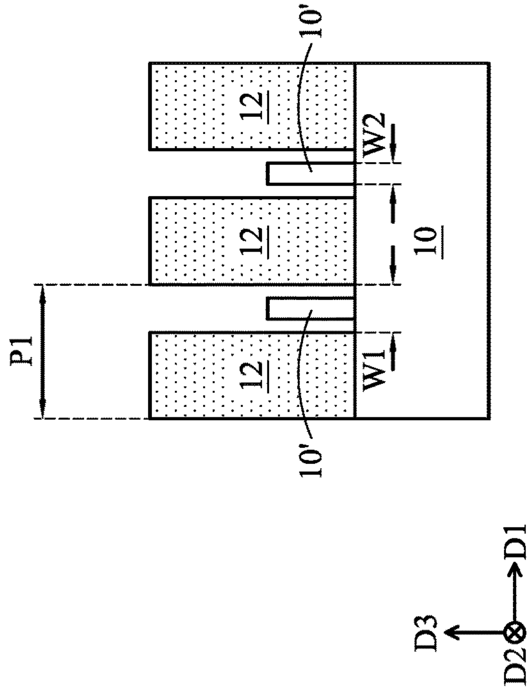
Figure 4A:
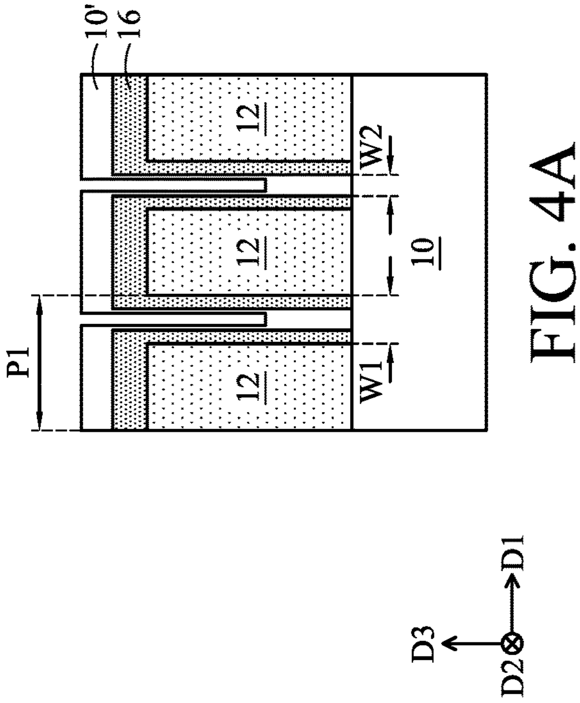

Referring to FIG. 4A to FIG. 4E, they are schematic cross-sectional views illustrating various stages of forming a sensing structure according to some embodiments, respectively. Containing to FIG. 3B, as shown in FIG. 4A, in some embodiments, a substrate material 10' may be conformally formed on the mask 16 and the substrate 10. In some embodiments, the substrate material 10' may include the material of the substrate 10. For example, the substrate material 10' may be silicon or silica. Therefore, a top profile of the substrate 10 may be adjusted by the substrate material 10'.

As shown in FIG. 4B, in some embodiments, the substrate material 10' on the sidewall of the mask 16 may be removed to expose the sidewall of the mask 16.

As shown in FIG. 4C, in some embodiments, the mask 16 may be removed to expose the patterned layer 12 and the substrate 10. In some embodiments, the mask 16 and the substrate material 10' on the mask 16 may be removed together.

Figure 4E:
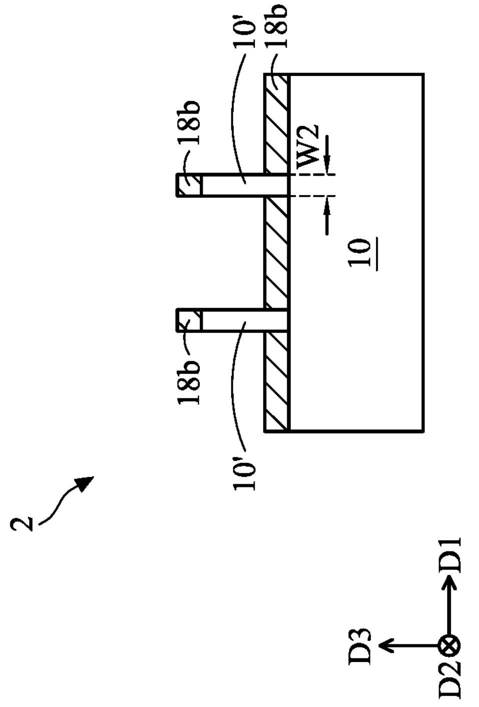
Figure 4D:
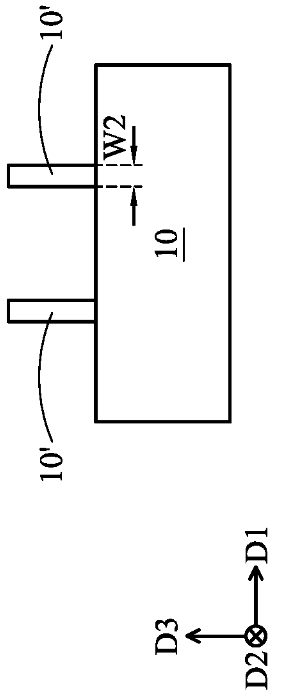

As shown in FIG. 4D, in some embodiments, after the removal of the mask 16, the patterned layer 12 may be removed.

As shown in FIG. 4E, in some embodiments, the second sublayer 18*b* may be formed on the substrate material 10' and on the substrate 10 to obtain a sensing structure 2.

Figures 5A, 5B, 5C, 5D:
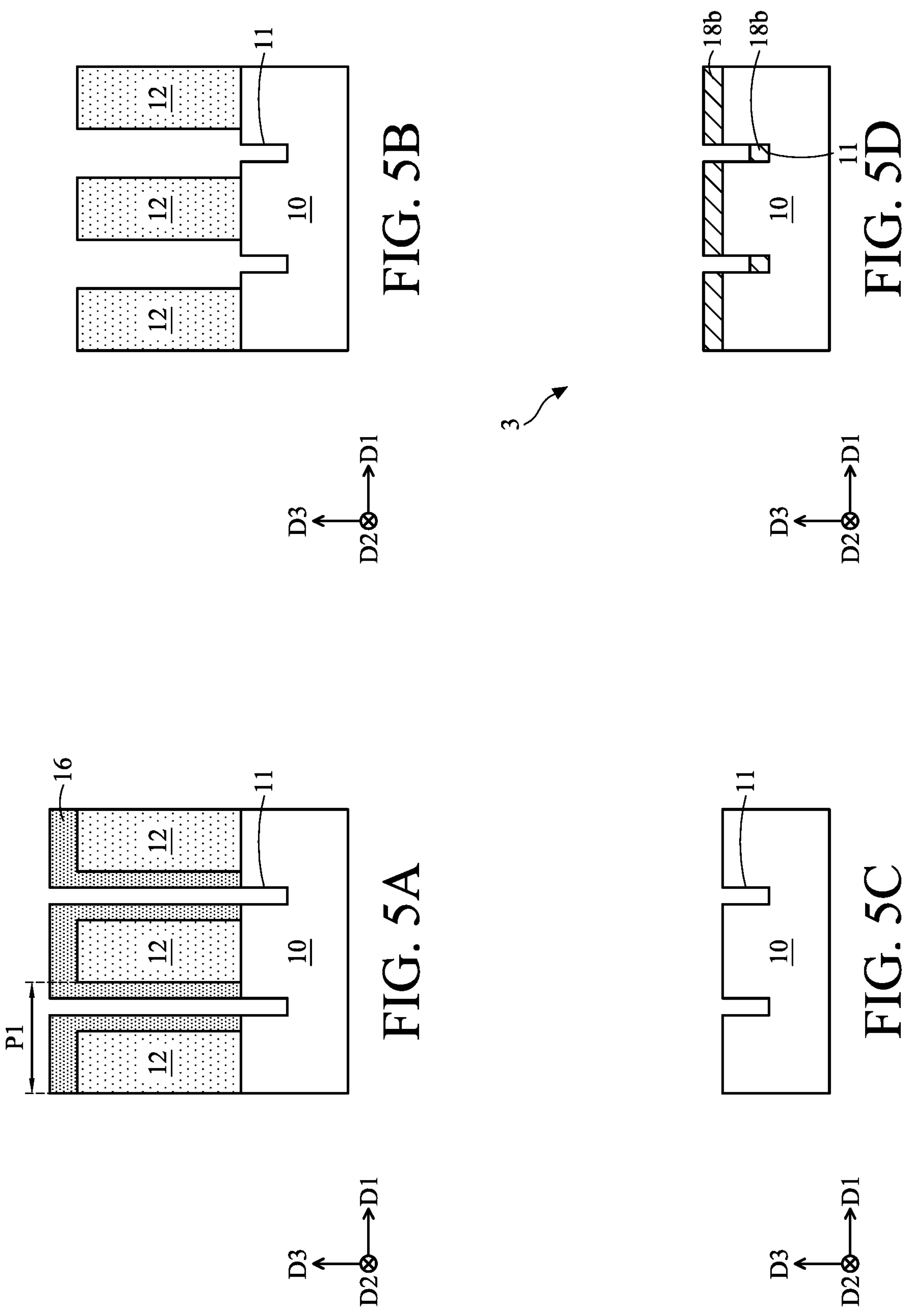
FIG. 5A to FIG. 5D are schematic cross-sectional views illustrating various stages of forming a sensing structure according to some embodiments, respectively.

Referring to FIG. 5A to FIG. 5D, they are schematic cross-sectional views illustrating various stages of forming a sensing structure according to some embodiments, respectively. Containing to FIG. 3B, as shown in FIG. 5A, in some embodiments, the substrate 10 may be etched by using the mask 16 as an etching mask to form recesses 11 in the substrate 10.

As shown in FIG. 5B, in some embodiments, the mask 16 may be removed to expose the patterned layer 12 and the substrate 10.

As shown in FIG. 5C, in some embodiments, after the removal of the mask 16, the patterned layer 12 may be removed.

As shown in FIG. 5D, in some embodiments, the second sublayer 18*b* may be formed on the substrate 10 and in the recess 11 to obtain a sensing structure 3.

The processes described above and shown in FIG. 1A to FIG. 1H, FIG. 2A, FIG. 2B, FIG. 3A, FIG. 3B, FIG. 4A to FIG. 4E, and FIG. 5A to FIG. 5D may be used and combined arbitrarily to form the other embodiments of the sensing structure. In the following, the sensing structure 1 is used as an example for detailed description, but the present disclosure is not limited thereto.

Figure 6:
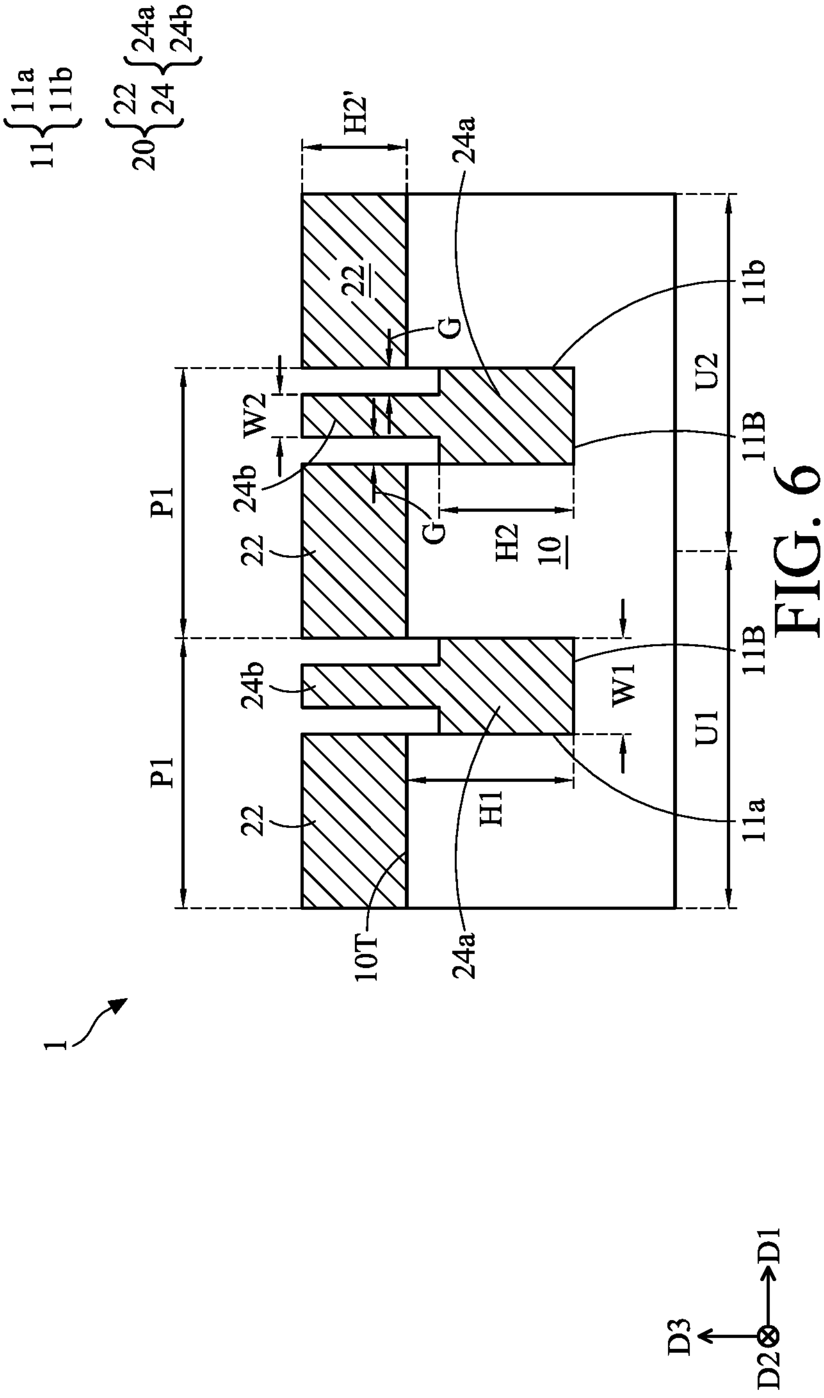
FIG. 6 is a schematic cross-sectional view illustrating a sensing structure according to some embodiments.

Referring to FIG. 6, it is a schematic cross-sectional view illustrating a sensing structure according to some embodiments. As shown in FIG. 6, in some embodiments, the first sublayer 18*a* and the second sublayer 18*b* may be collectively referred to as a metal layer 20. In some embodiments, the metal layer 20 may be formed on the substrate 10 and in the recess 11. In some embodiments, the metal layer 20 may include a first portion 22 and the second portion 24. In some embodiments, the first portion 22 may be disposed on the top surface 10T of the substrate 10, and the second portion 24 may be disposed in the recess 11. The first portion 22 may formed by a portion of the second sublayer 18*b*, and the second portion 24 may be formed by the first sublayer 18*a* and the remaining portion of the second sublayer 18*b* (as shown in FIG. 1H). In some embodiments, the second portion 24 may be periodically arranged nanoslits.

In some embodiments, the second portion 24 may include a base portion 24*a* and a protruding portion 24*b* disposed on the base portion 24*a* and extending away from the substrate 10. In some embodiments, the protruding portion 24*b* may extends upward of the substrate 10 in the third direction D3. In some embodiments, the first portion 22 and the protruding portion 24*b* of the second portion 24 may be separated by the gap G. That is, the gap G may be between the first portion 22 and the protruding portion 24*b* of the second portion 24. In some embodiments, the gap G may surround the protruding portion 24*b* of the second portion 24. Accordingly, since the dimension of the gap G may be controlled by the first width W1 and the second width W2, the sensitivity of the sensing structure 1 of the present disclosure may be improved. For example, when the gap G is in a range of 20 nm to 100 nm, the amount of wavelength shift (shown in FIG. 16B) may be increased, thereby increasing the sensitivity of the sensing structure.

In some embodiments, the first height H1 of the recess 11 as shown in FIG. 1B is the first height H1 of the top surface 10T of the substrate 10 to the bottom surface 11B of the recess 11 as shown in FIG. 6. In some embodiments, the first height H1 may be in a range of 20 nm to 100 nm. For example, the first height H1 may be 20 nm, 30 nm, 40 nm, 50 nm, 60 nm, 70 nm, 80 nm, 90 nm, 100 nm, or any value or any range of values between the aforementioned values. For example, the first height H1 may be 20 nm to 50 nm. In some embodiments, the substrate 10 may include a protruding portion with the first height H1. Accordingly, since the dimension of the protruding portion of the substrate 10 may be controlled, the sensitivity of the sensing structure 1 of the present disclosure may be improved. In detail, when the first height H1 is in a range of 20 nm to 100 nm, the peak value or the valley value of the characteristic peak may be obviously observed. Further, when the first height H1 is in a range of 20 nm to 50 nm, the peak value or the valley value of the characteristic peak may be more obviously observed. When the characteristic peaks are easier to observe, the sensitivity of the sensing structure is higher.

As shown in FIG. 6, in some embodiments, in the third direction D3, a second height H2 of the base portion 24*a* of the second portion 24 may be in a range of 20 nm to 100 nm. For example, the second height H2 may be 20 nm, 30 nm, 40 nm, 50 nm, 60 nm, 70 nm, 80 nm, 90 nm, 100 nm, or any value or any range of values between the aforementioned values. In some embodiments, the based portion 24*a* may be partially or completely fills the recess 11. In some embodiments, the first height H1 may be the same as the second height H2, so that the top surface of the base portion 24*a* may be aligned with the top surface 10T of the substrate 10.

As shown in FIG. 6, in some embodiments, in the third direction D3, a second height H2' of the first portion 22 may be in a range of 20 nm to 100 nm. For example, the second height H2' may be 20 nm, 30 nm, 40 nm, 50 nm, 60 nm, 70 nm, 80 nm, 90 nm, 100 nm, or any value or any range of values between the aforementioned values. In some embodiments, the second height H2' of the first portion 22 may be the same as the second height H2 of the base portion 24*a* since the base portion 24*a* and the first portion 22 are formed in the same process. Accordingly, the second height H2' of the first portion 22 may affect the sensed characteristic peaks. In detail, as the second height H2' increases, the sensed characteristic peak may also be redshifted. For example, a wavelength of the sensed characteristic peak may be increased.

As shown in FIG. 6, in some embodiments, in the first direction D1, the recess 11 may include a first recess 11*a* and a second recess 11*b* adjacent to the first recess 11*a*. In some embodiments, the number of the recess 11 may be greater than 2. For example, the number of the recess 11 may be 2, 5, 10, 50, 100, or more, but the present disclosure is not limited thereto. In some embodiments, the first pitch P1 between the first recess 11*a* and the second recess 11*b* may be in a range of 250 nm to 450 nm. For example, the first pitch P1 may be 250 nm, 275 nm, 300 nm, 325 nm, 350 nm, 375 nm, 400 nm, 425 nm, 450 nm, or any value or any range of values between the aforementioned values.

As shown in FIG. 6, in some embodiments, the first width W1 of the base portion 24*a* of the second portion 24 may be in a range of 120 nm to 250 nm. For example, the first width W1 may be 120 nm, 130 nm, 140 nm, 150 nm, 160 nm, 170 nm, 180 nm, 190 nm, 200 nm, 210 nm, 220 nm, 230 nm, 240 nm, 250 nm, or any value or any range of values between the aforementioned values. In some embodiments, the second width W2 of the protruding portion 24*b* may be in a range of 40 nm to 250 nm. For example, the second width W2 may be 40 nm, 50 nm, 75 nm, 100 nm, 125 nm, 130 nm, 140 nm, 145 nm, 150 nm, 175 nm, 200 nm, 225 nm, 250 nm, or any value or any range of values between the aforementioned values. For example, the second width W2 may be less than 150 nm. In some embodiments, the first width W1 of the base portion 24*a* of the second portion 24 is greater than a second width W2 of the protruding portion 24*b*. In some embodiments, in the first direction D1, the first pitch P1 may be greater than the first width W1 of the base portion 24*a* of the second portion 24.

In some embodiments, a relationship of the first pitch P1, the first width W1, and the second width W2 may affect the value of the characteristic peak. In some embodiments, in the sensing structure 1, the first pitch P1 may be 400 nm, the first width W1 may be 240 nm, the second width W2 may be 80 nm. Further, the material of the metal layer 20 may also affect the value of the characteristic peak. In this embodiments, the metal layer 20 includes gold. In this embodiment, the first height H1 may be 40 nm, the second height H2 may be 20 nm, and the second height H2' may be 20 nm.

As shown in FIG. 6, in some embodiments, an extending direction (not shown) of the second portion 24 of the metal layer 20 may be the second direction D2. In some embodiments, the top surface of the protruding portion 24*b* is higher than the top surface of the base portion 24*a*. In some embodiments, the top surface of the base portion 24*a* is lower than the top surface 10T of the substrate 10.

Accordingly, since the sensing structure have specific dimensions, materials, relationships, and other parameters, the sensitivity of the sensing structure of the present disclosure may be improved.

Figure 8:
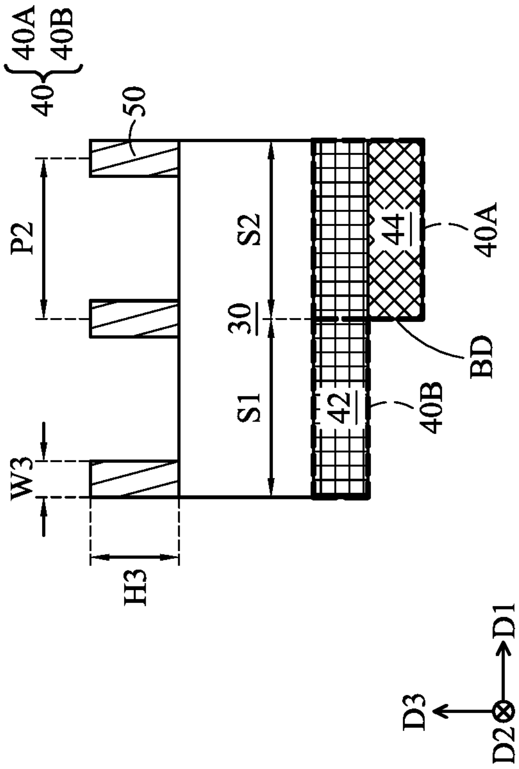
FIG. 8 is a schematic cross-sectional view illustrating various stages of forming a sensing chip according to some embodiments.
Figure 7:
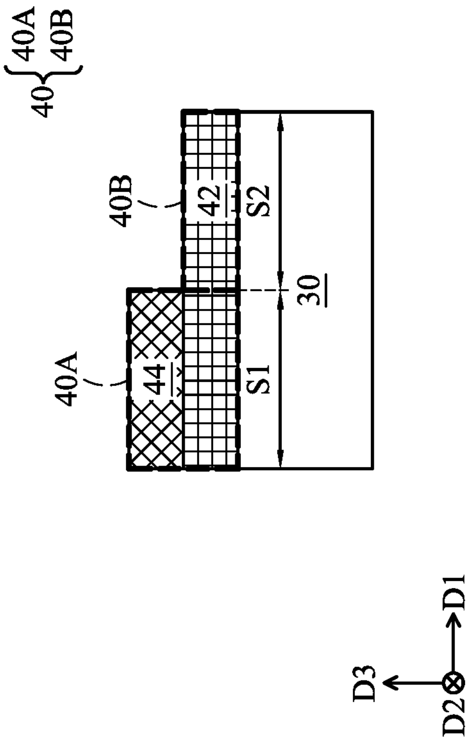
FIG. 7 is a schematic cross-sectional view illustrating various stages of forming a sensing chip according to some embodiments

Referring to FIG. 7 and FIG. 8, they are schematic cross-sectional views illustrating various stages of forming a sensing chip according to some embodiments, respectively. As shown in FIG. 7, in some embodiments, a carrier layer 30 may be provided and a filter array 40 may be disposed on the carrier layer 30. In some embodiments, materials of the carrier layer 30 may be different or the same as materials of the substrate 10. For example, the carrier layer 30 may include silica. In some embodiments, the filter array 40 may include a first filter 42 and a second filter 44, the first filter 42 may be disposed on the carrier layer 30, and the second filter 44 may be disposed on the first filter 42. In some embodiments, the second filter 44 may cover a portion of the first filter 42 and expose the remaining portion of the first filter 42. In some embodiments, the portion of the first filter 42 covered by the second filter 44 and the second filter 44 thereon may be collectively referred to as a first filter unit 40A. In some embodiments, the remaining portion of the first filter 42 exposed by the second filter 44 may be referred to as a second filter unit 40B. In some embodiments, the first filter unit 40A may be disposed adjacent to the second filter unit 40B. In some embodiments, the first filter unit 40A and the second filter unit 40B may be arranged in array so as to form the filter array 40.

In some embodiments, the first filter 42 may be a band pass filter with a first wavelength range and the first wavelength range may be in a range of 380 nm to 780 nm. In some embodiments, the second filter 44 may be a band pass filter with a second wavelength range and the second wavelength range may be in a range of 380 nm to 780 nm. In other embodiments, the second filter 44 may be a long pass filter with the second wavelength range (that is, the cutoff wavelength) greater than any value of 380 nm to 780 nm. In some embodiments, the first wavelength range of the first filter 42 may be overlapped with the second wavelength range of the second filter 44 to calculate light fluxes. In some embodiments, the first wavelength range of the first filter 42 may include a first maximum and a first minimum, the second wavelength range of the second filter 44 may include a second maximum and a second minimum, the first maximum is between the second maximum and the second minimum.

For example, since the first filter unit 40A includes the first filter 42 and the second filter 44, the light flux F1 corresponding to an overlapped range between the first wavelength range and the second wavelength range (that is, a range between the first maximum and the second minimum) may be obtained. Also, since the second filter unit 40B includes the first filter 42, the light flux F2 corresponding to the first wavelength range (that is, a range between the first maximum and the first minimum) may be obtained. Then, the light flux F2 minus the light flux F1 to obtain the light flux F3 corresponding to a range between the second minimum to the first minimum. Thus, amount of wavelength shift in the characteristic peaks may be estimated by the ratio of light flux F3 to light flux F2 (light flux F3/light flux F2).

In some embodiments, in the first direction D1, a first spacing S1 of the first filter unit 40A and a second spacing S2 of the second filter unit 40B may be in a range of 2 um to 20 um. For example, the first spacing S1 and the second spacing S2 may be 2 um, 4 um, 6 um, 8 um, 10 um, 12 um, 14 um, 16 um, 18 um, 20 um, or any value or any range of values between the aforementioned values. In some embodiments, the first spacing S1 may be equal to the second spacing S2.

As shown in FIG. 8, in some embodiments, the structure shown in FIG. 7 may be turned upside down. In some embodiments, a light-blocking layer 50 may be disposed on the carrier layer 30 and the carrier layer 30 may be disposed between the light-blocking layer 50 and the filter array 40. In other words, the light-blocking layer 50 and the filter array 40 may be disposed on the opposite sides of the carrier layer 30. In some embodiments, the light-blocking layer 50 may be disposed directly above the boundary BD between the first filter unit 40A and the second filter unit 40B. Therefore, the light-blocking layer 50 may prevent light passing through different filter units such as the first filter unit 40A and the second filter unit 40B from interfering with each other, thereby improving accuracy and sensitivity of the sensing chip.

In some embodiments, the light-blocking layer 50 may include metal, metal oxide such as $Al_2O_3$, or other suitable light-blocking material. In some embodiments, the light-blocking layer 50 may include non-transparent materials at the wavelength range filtered by the first filter 42 and the second filter 44. In some embodiments, a light transmittance in wavelength of 380 nm to 780 nm of the light-blocking layer 50 may be less than 5%. For example, the light transmittance of the light-blocking layer 50 may be 5%, 4%, 3%, 2%, 1% or less. The light transmittance of the light-blocking layer 50 may be substantially zero. In some embodiments, a light absorbance in wavelength of 380 nm to 780 nm of the light-blocking layer 50 may be greater than 95%. For example, the light absorbance of the light-blocking layer 50 may be 95%, 96%, 97%, 98%, 99%, 99.9%, or more. The light absorbance of the light-blocking layer 50 may be substantially 100%.

In some embodiments, the light-blocking layer 50 may have a third height H3 in the third direction D3 and a third width W3 in the first direction D1. In some embodiments, the third height H3 of the light-blocking layer 50 may be in a range of 90 nm to 250 nm. For example, the third height H3 may be 90 nm, 100 nm, 125 nm, 150 nm, 175 nm, 200 nm, 225 nm, 250 nm, or any value or any range of values between the aforementioned values. In some embodiments, the third width W3 of the light-blocking layer 50 may be in a range of 80 nm to 150 nm. For example, the third width W3 may be 80 nm, 90 nm, 100 nm, 110 nm, 120 nm, 130 nm, 140 nm, 150 nm, or any value or any range of values between the aforementioned values.

In some embodiments, a second pitch P2 of the light-blocking layer 50 may be in a range of 2 um to 20 um. For example, the second pitch P2 may be 2 um, 4 um, 6 um, 8 um, 10 um, 12 um, 14 um, 16 um, 18 um, 20 um, or any value or any range of values between the aforementioned values. In some embodiments, the second pitch P2 may be equal to the first spacing S1 and the second spacing S2.

Figure 9:
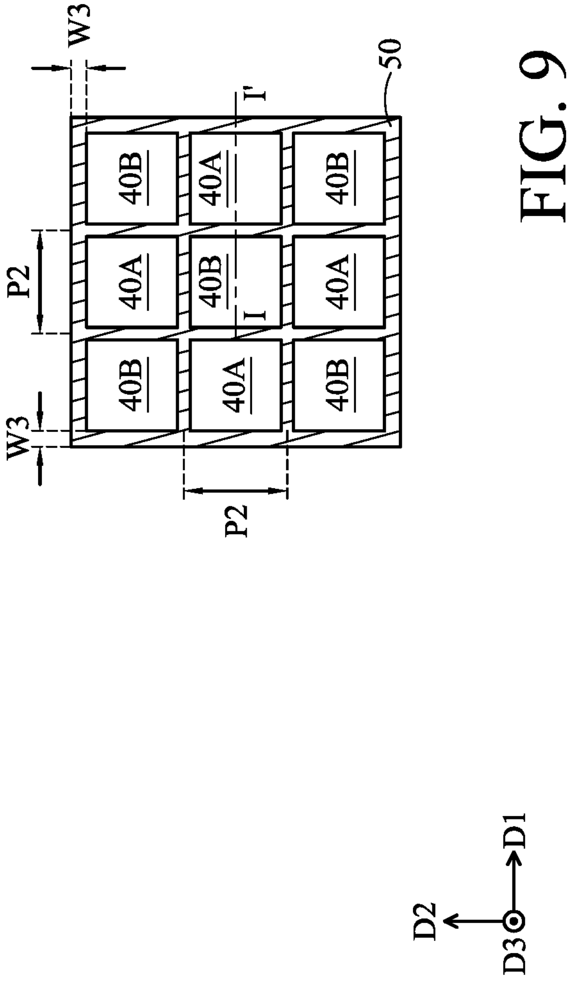
FIG. 9 is a schematic top view illustrating a light-blocking layer according to some embodiments.

Referring to FIG. 9, it is a schematic top view illustrating a light-blocking layer according to some embodiments. FIGS. 7 and 8 show a cross-sectional view taken along line I-I' as shown in FIG. 9. For ease of explanation, some components are omitted in FIG. 9. In some embodiments, in a top view, the light-blocking layer 50 may have a frame shape corresponding to the filter array 40. In some embodiments, for ease of installation, a number of filter units of the filter array 40 may be nine, but the present disclosure is not limited thereto. For example, the number of filter units of the filter array 40 may be an integer between 2 to 1000.

In the following, together with FIG. 10A to FIG. 10F, an example method of forming the light-blocking layer 50 is described.

Figure 10B:
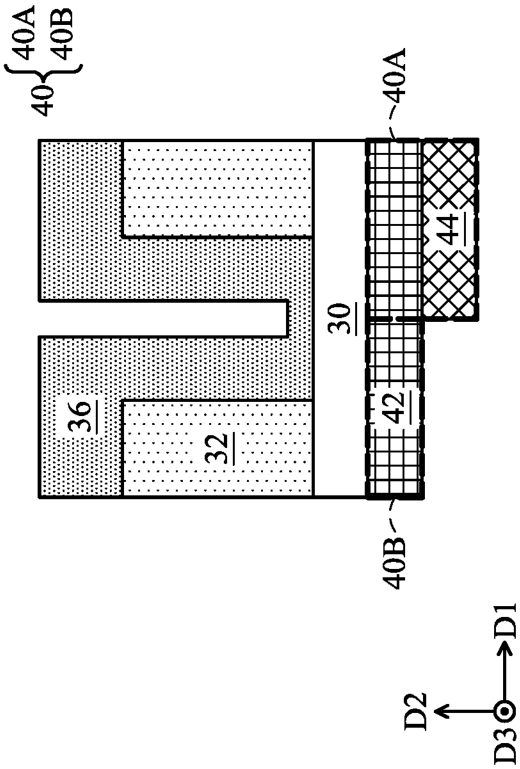
FIG. 10A to FIG. 10F are schematic cross-sectional views illustrating various stages of forming a light-blocking layer according to some embodiments, respectively.
Figure 10C:
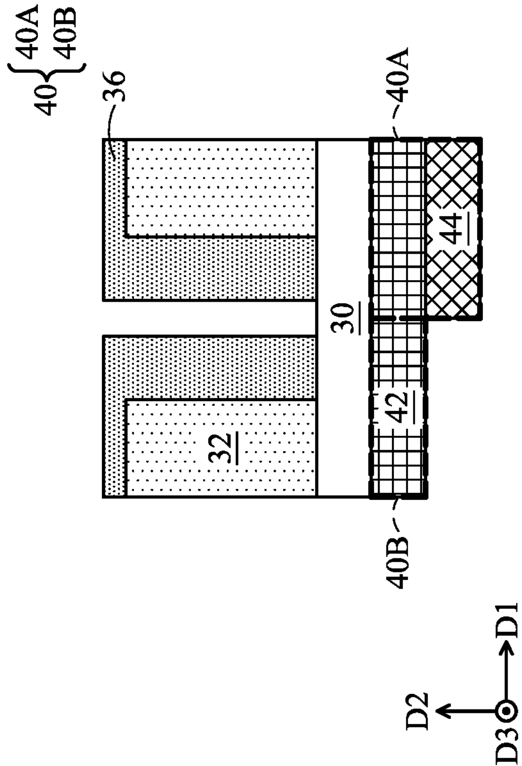
Figure 10A:
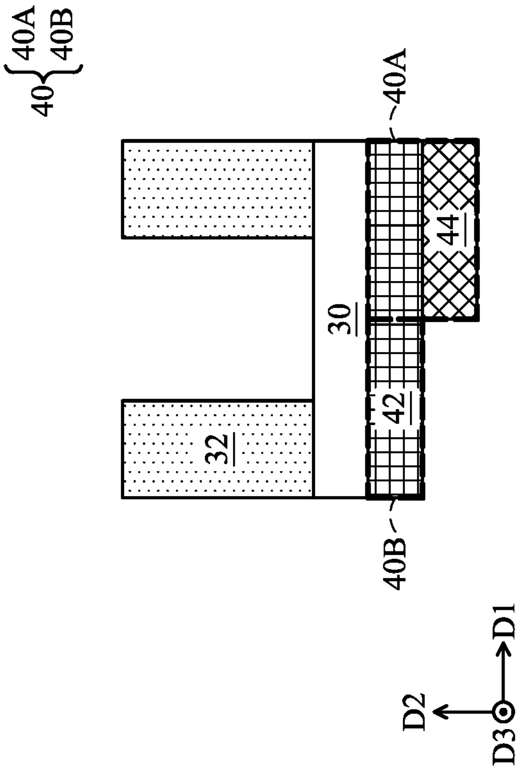

Referring to FIG. 10A to FIG. 10F, they are schematic cross-sectional views illustrating various stages of forming the light-blocking layer 50 according to some embodiments, respectively. As shown in FIG. 10A, in some embodiments, the structure shown in FIG. 7 may be turned upside down and a patterned layer 32 may be formed on the carrier layer 30. In some embodiments, the carrier layer 30 may be disposed between the filter array 40 and the patterned layer 32. In some embodiments, materials of the patterned layer 32 may be the same as materials of the patterned layer 12.

As shown in FIG. 10B, in some embodiments, a mask 36 may be conformally formed on the patterned layer 32 and on the carrier layer 30. In some embodiments, materials of the mask 36 may be the same as materials of the mask 16.

As shown in FIG. 10C, in some embodiments, an anisotropic etching process may be performed to expose a portion of the carrier layer 30. In some embodiments, after the anisotropic etching process, the mask 36 on the patterned layer 32 may be thinned and the mask 36 on the carrier layer 30 may be partially removed.

Figure 10D:
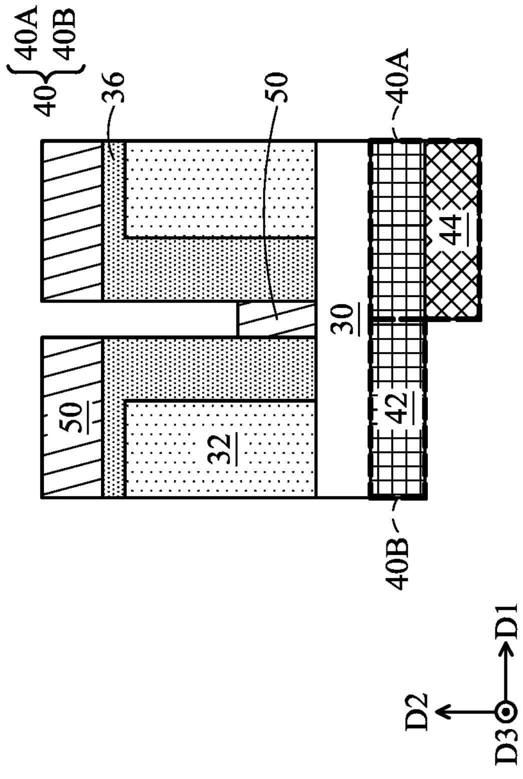

As shown in FIG. 10D, in some embodiments, the light-blocking layer 50 may be formed on the mask 36 and on the carrier layer 30.

Figure 10E:
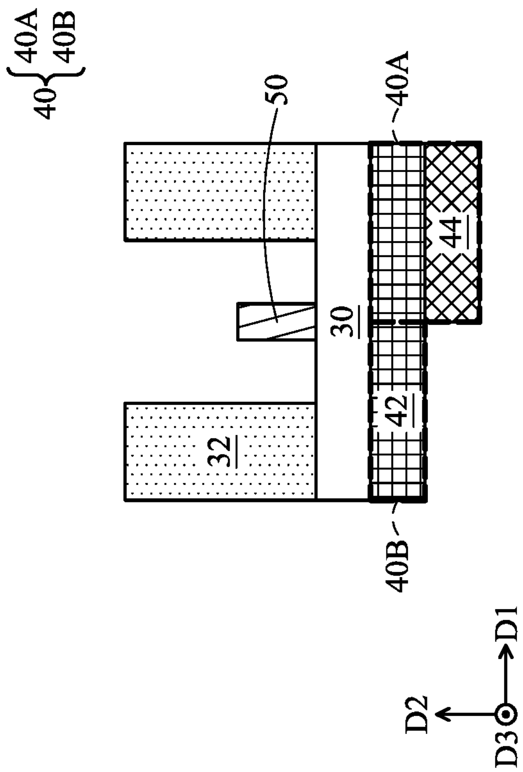

As shown in FIG. 10E, in some embodiments, the mask 36 may be removed to expose the patterned layer 32. In some embodiments, the mask 36 and the light-blocking layer 50 on the mask 36 may be removed together and the light-blocking layer 50 on the carrier layer 30 may be remained.

Figure 10F:
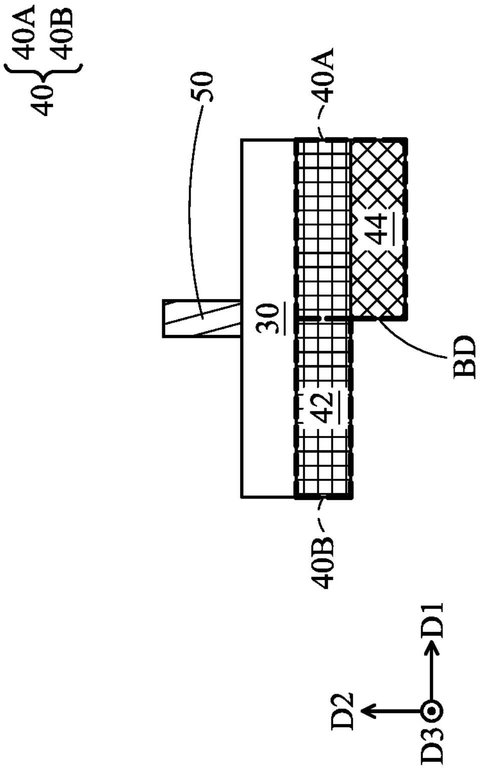

As shown in FIG. 10F, in some embodiments, after the removal of the mask 36, the patterned layer 32 may be removed to form the light-blocking layer 50. In some embodiments, the patterned layer 32 may be removed by ashing process or other suitable process.

Figure 11:
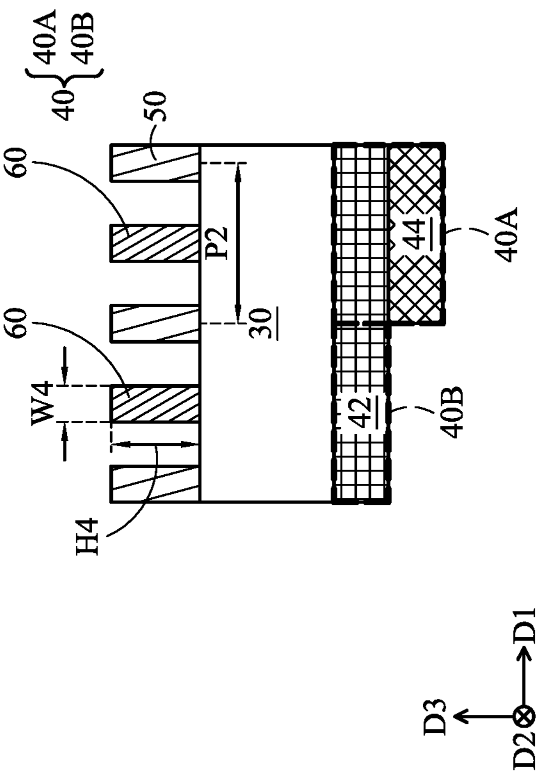
FIG. 11 is schematic cross-sectional views illustrating various stages of forming a sensing chip according to some embodiments.

FIG. 11 is schematic cross-sectional views illustrating various stages of forming a sensing chip according to some embodiments. As shown in FIG. 11, in some embodiments, a polarizer 60 may be disposed on the structure shown in FIG. 8. In some embodiments, a polarizer 60 may be disposed on the carrier layer 30 and adjacent to the light-blocking layer 50. In some embodiments, the polarizer 60 may function as a grating. In some embodiments, the polarizer 60 may be disposed directly above each filter unit of the filter array 40. For example, the polarizer 60 may be disposed directly above the first filter unit 40A and the second filter unit 40B.

In some embodiments, the polarizer 60 may have a fourth height H4 in the third direction D3 and a fourth width W4 in the first direction D1. In some embodiments, the fourth height H4 of the polarizer 60 may be in a range of 90 nm to 250 nm. For example, the fourth height H4 may be 90 nm, 100 nm, 125 nm, 150 nm, 175 nm, 200 nm, 225 nm, 250 nm, or any value or any range of values between the aforementioned values. In some embodiments, the fourth width W4 of the polarizer 60 may be in a range of 80 nm to 150 nm. For example, the fourth width W4 may be 80 nm, 90 nm, 100 nm, 110 nm, 120 nm, 130 nm, 140 nm, 150 nm, or any value or any range of values between the aforementioned values.

Figure 12:
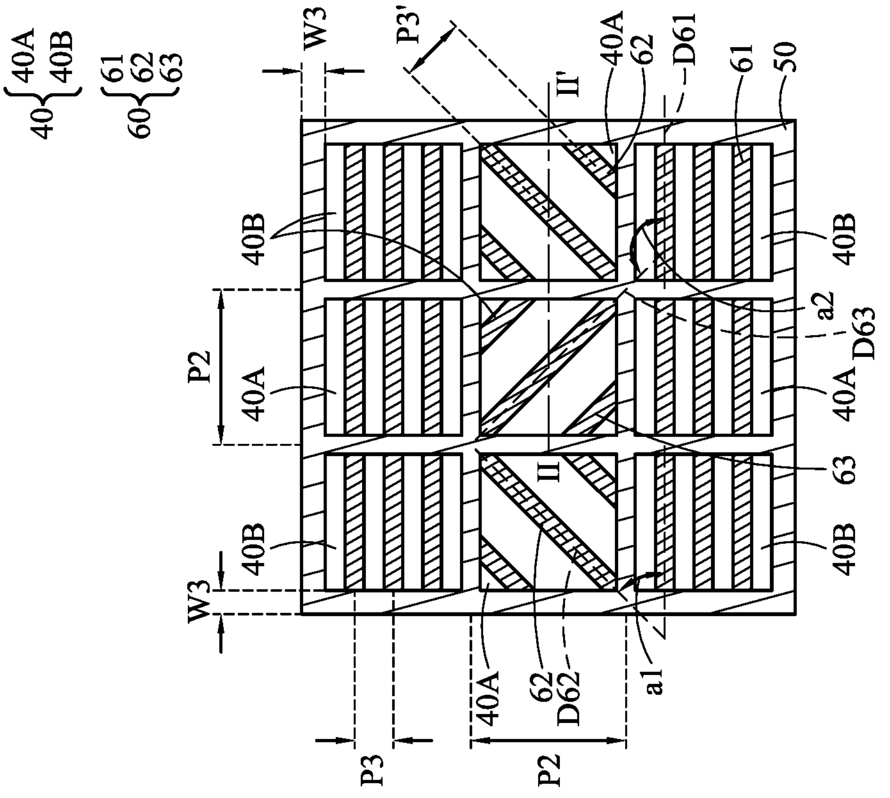
FIG. 12 is a schematic top view illustrating a polarizer according to some embodiments.

Referring to FIG. 12, it is a schematic top view illustrating a polarizer according to some embodiments. FIG. 11 shows a cross-sectional view taken along line II-II' as shown in FIG. 12. For ease of explanation, some components are omitted in FIG. 11. In some embodiments, the polarizer 60 may include a first polarizer 61, a second polarizer 62, and a third polarizer 63 having different extending directions in a top view. In some embodiments, each of the first polarizer 61, the second polarizer 62, and the third polarizer 63 may include a plurality of polarizer plates. In some embodiments, the number of the polarizer plates included in each of the first polarizer 61, the second polarizer 62, and the third polarizer 63 may be adjusted according to the first spacing S1 and the second spacing S2.

In some embodiments, a third pitch P3 and P3' of the polarizer 60 may be in a range of 80 nm to 150 nm. For example, the third pitch P3 and P3' may be 80 nm, 90 nm, 100 nm, 110 nm, 120 nm, 130 nm, 140 nm, 150 nm, or any value or any range of values between the aforementioned values. In some embodiments, the third pitch P3 is a distance between the adjacent two polarizer plates of the first polarizer 61. In some embodiments, the third pitch P3' is a distance between the adjacent two polarizer plates of the second polarizer 62 or the third polarizer 63. In some embodiments, the third pitch P3' may be greater than the third pitch P3.

In some embodiments, an extending direction D61 of the first polarizer 61 may be first direction D1. In some embodiments, in a counterclockwise direction, the angle a1 between the extending direction D61 of the first polarizer 61 and the extending direction D62 of the second polarizer 62 is 45±5°. For example, the angle a1 may be 40°, 41°, 42°, 43°, 44°, 45°, 46°, 47°, 48°, 49°, 50°, or any value or any range of values between the aforementioned values. In some embodiments, in a counterclockwise direction, the angle a2 between the extending direction D61 of the first polarizer 61 and the extending direction D63 of the third polarizer 63 is 135±5°. For example, the angle a1 may be 130°, 131°, 132°, 133°, 134°, 135°, 136°, 137°, 138°, 139°, 140°, or any value or any range of values between the aforementioned values. In some embodiments, the angle between the extending direction D62 of the second polarizer 62 and the extending direction D63 of the third polarizer 63 is 90±5°. For example, the angle between the extending direction D62 and the extending direction D63 may be 85°, 86°, 87°, 88°, 89°, 90°, 91°, 92°, 93°, 94°, 95°, or any value or any range of values between the aforementioned values.

In the following, together with FIG. 13A to FIG. 13F, an example method of forming the polarizer 60 is described.

Figure 13B:
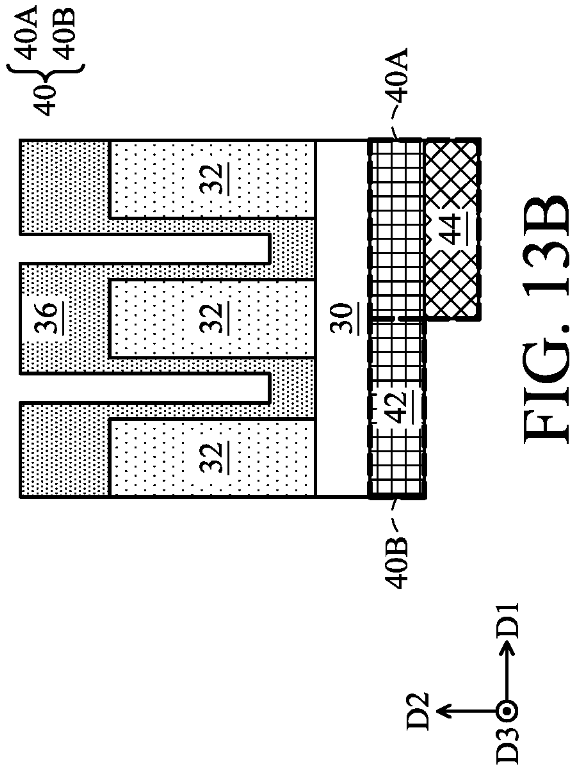
FIG. 13A to FIG. 13F are schematic cross-sectional views illustrating various stages of forming a polarizer according to some embodiments, respectively.
Figure 13A:
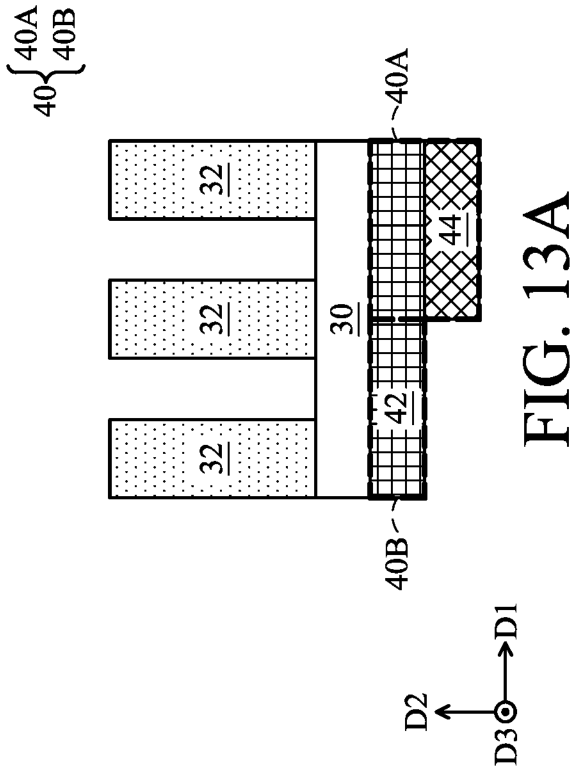

Referring to FIG. 13A to FIG. 13F, they are schematic cross-sectional views illustrating various stages of forming the polarizer 60 according to some embodiments, respectively. As shown in FIG. 13A, in some embodiments, the structure shown in FIG. 7 may be turned upside down and the patterned layer 32 may be formed on the carrier layer 30.

As shown in FIG. 13B, in some embodiments, the mask 36 may be conformally formed on the patterned layer 32 and on the carrier layer 30.

Figure 13C:
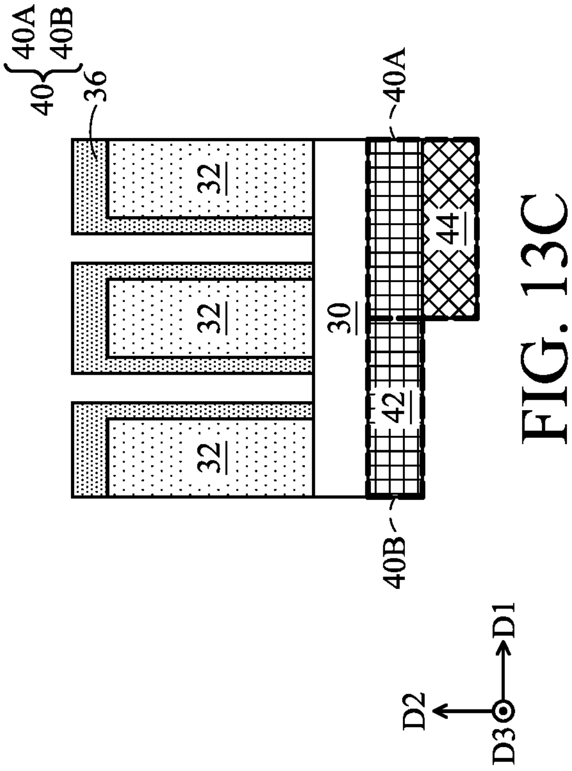

As shown in FIG. 13C, in some embodiments, an anisotropic etching process may be performed to expose a portion of the carrier layer 30.

Figure 13E:
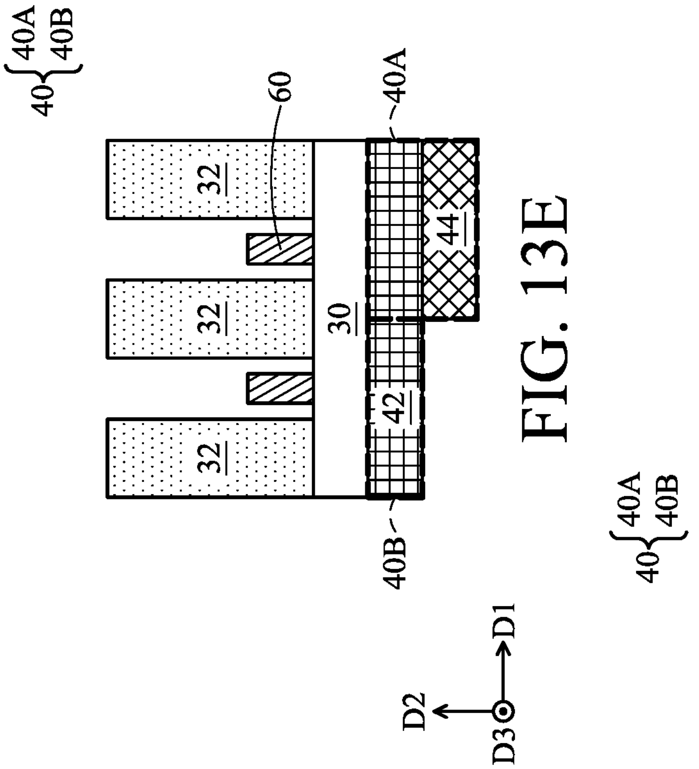
Figure 13D:
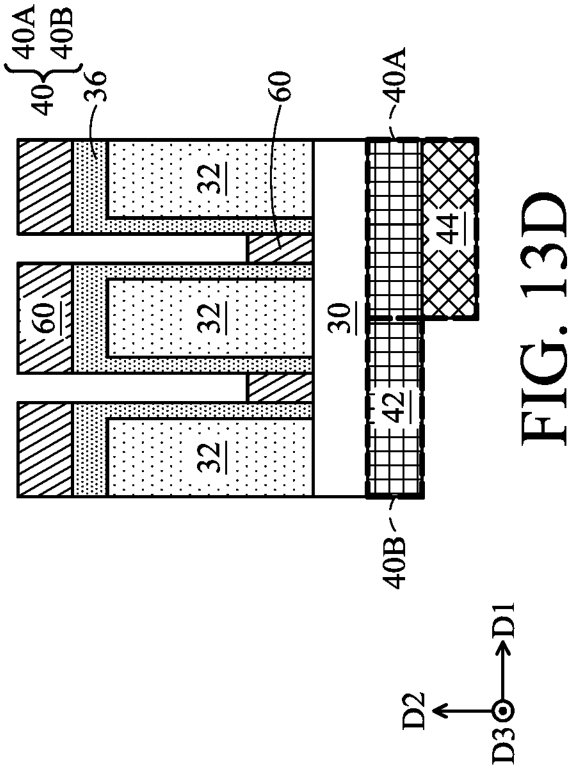

As shown in FIG. 13D, in some embodiments, the polarizer 60 may be formed on the mask 36 and on the carrier layer 30.

As shown in FIG. 13E, in some embodiments, the mask 36 may be removed to expose the patterned layer 32. In some embodiments, the mask 36 and the polarizer 60 on the mask 36 may be removed together and the polarizer 60 on the carrier layer 30 may be remained.

Figure 13F:
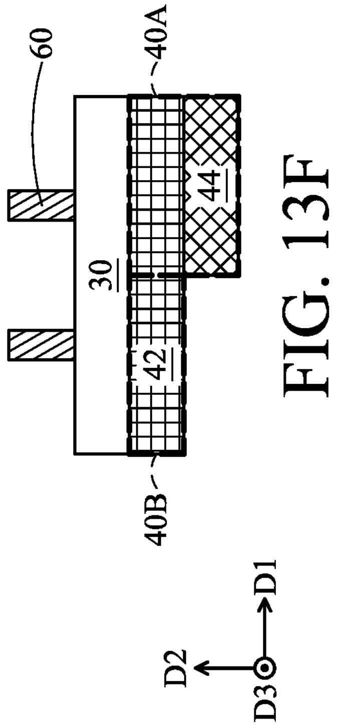

As shown in FIG. 13F, in some embodiments, after the removal of the mask 36, the patterned layer 32 may be removed to form the polarizer 60.

Figure 14:
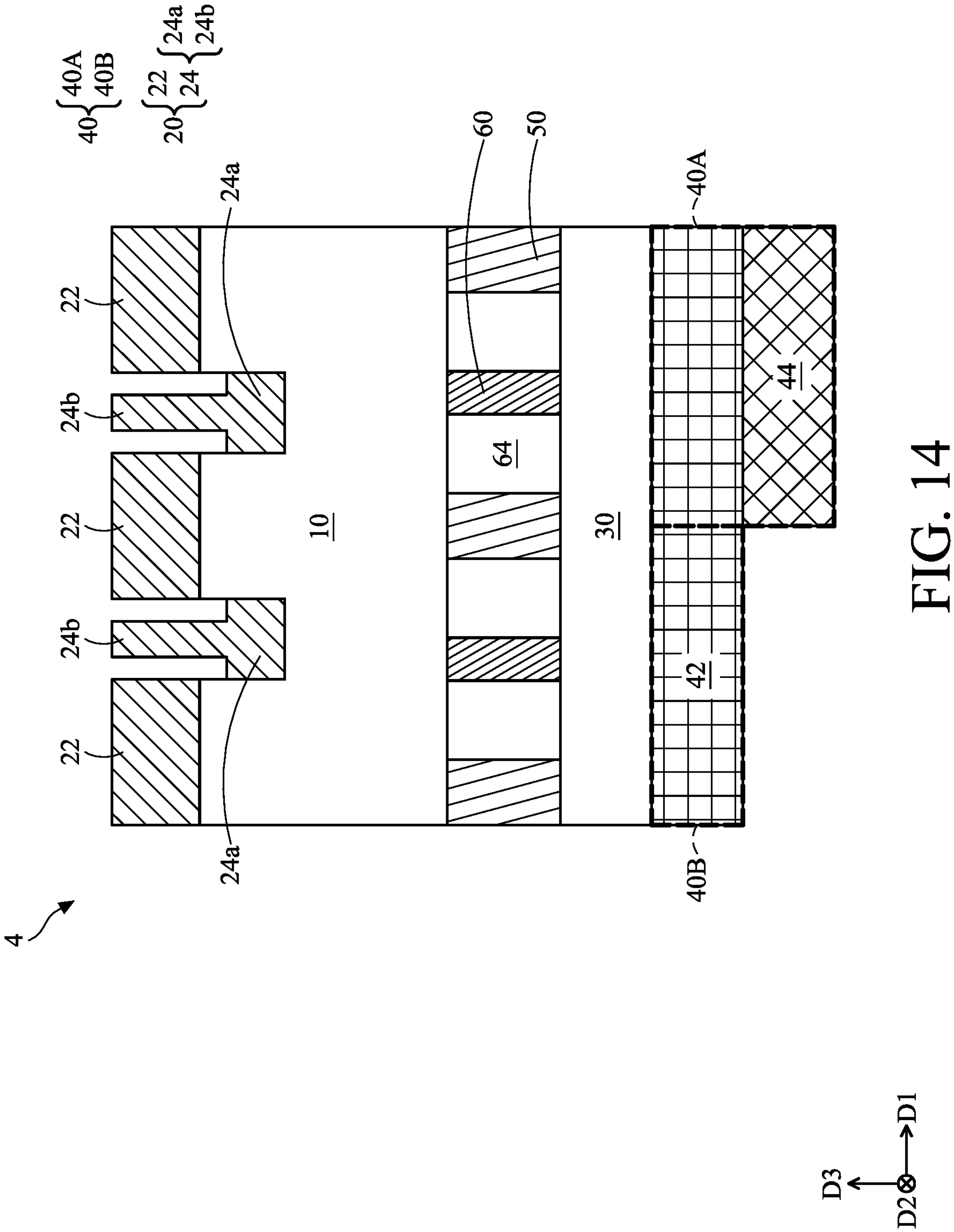
FIG. 14 is a schematic cross-sectional view illustrating a sensing chip according to some embodiments.

Referring to FIG. 14, it is a schematic cross-sectional view illustrating a sensing chip 4 according to some embodiments. As shown in FIG. 14, a planarization layer 64 may be formed on the structure shown in FIG. 11, and one of the sensing structures 1 to 3 may be disposed on the light-blocking layer 50, the polarizer 60, and the planarization layer 64. Thus, a sensing chip 4 may be obtained. In some embodiments, the planarization layer 64 may include oxides such as silicon oxide, nitrides such as silicon nitride, oxynitrides such as silicon oxynitrides, other suitable planarization materials, or a combination thereof, but the present disclosure is not limited thereto. In some embodiments, the planarization layer 64 may be formed by a deposition process. In some embodiments, after formation of the planarization layer 64, the substrate 10 may be formed on the planarization layer 64 by the deposition process or an epitaxy process.

Figure 15B:
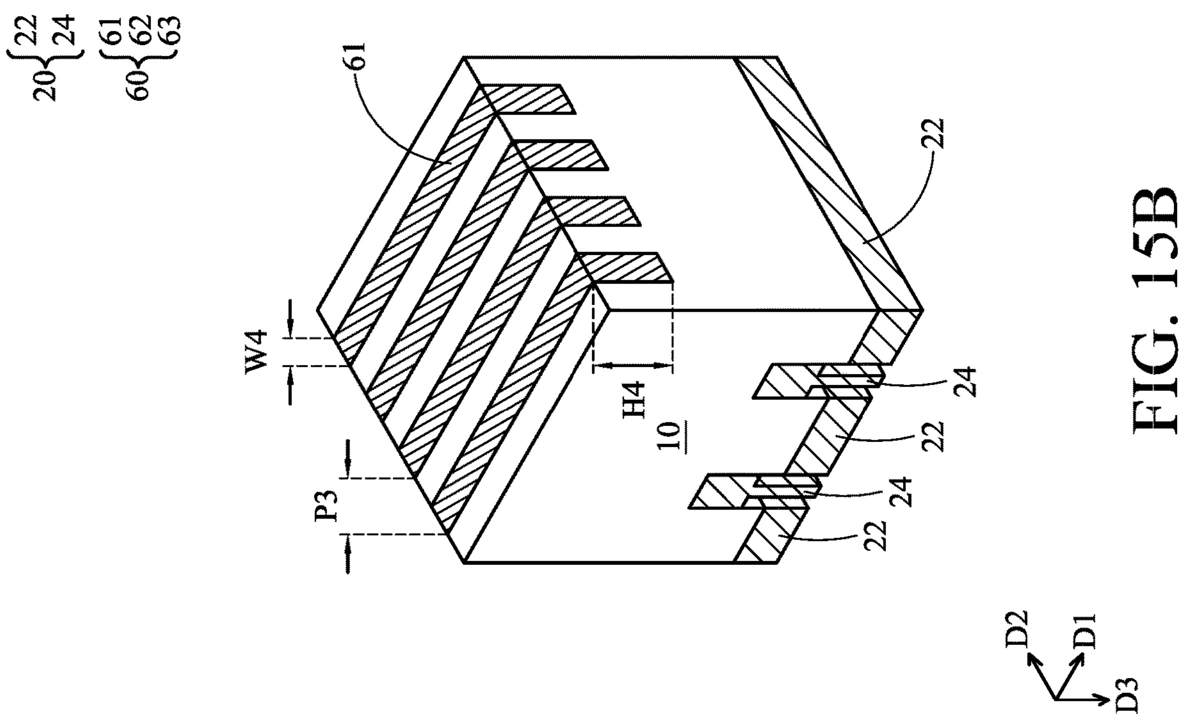
FIG. 15A and FIG. 15B are schematic views illustrating a polarizer according to some embodiments.
Figure 15A:
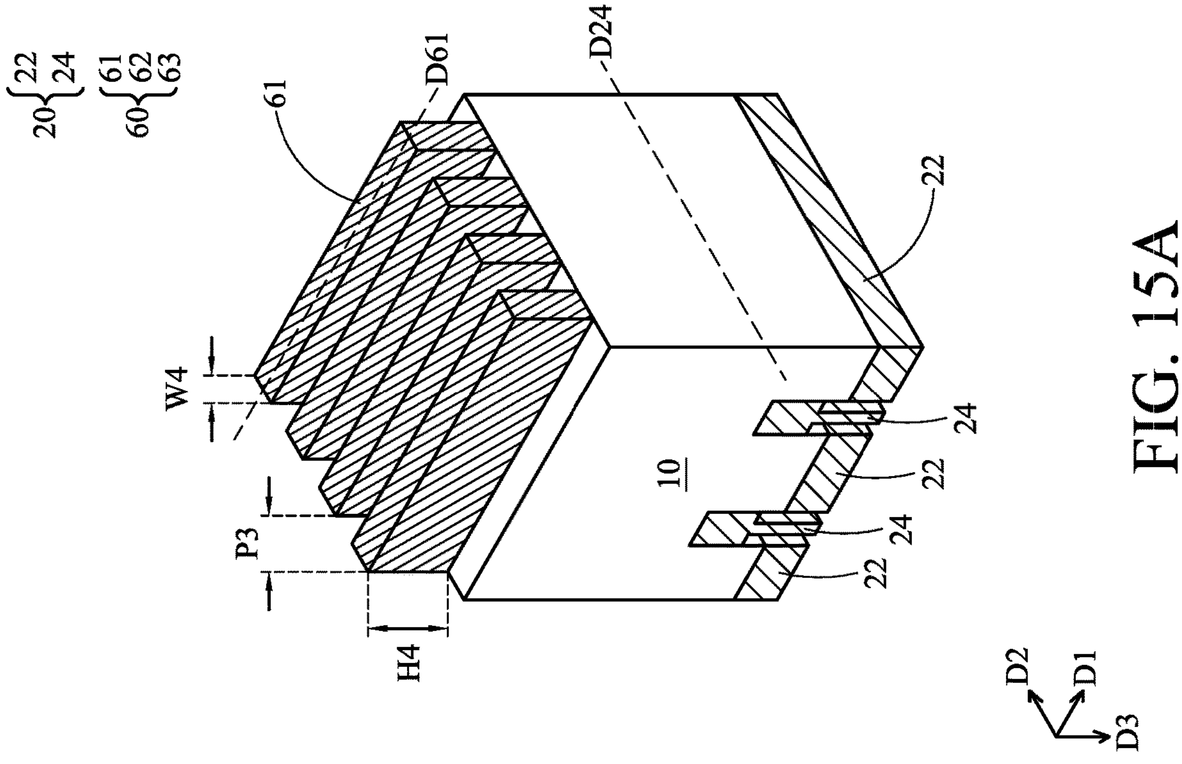

Referring to FIG. 15A and FIG. 15B, they are schematic views illustrating the first polarizer 61 according to some embodiments. As shown in FIG. 15A, in some embodiments, the first polarizer 61 may be disposed on a backside of the sensing structure. In some embodiments, an extending direction D24 of the second portion 24 of the metal layer 20 may be the second direction D2. In some embodiments, the extending direction D24 of the second portion 24 of the metal layer 20 may be perpendicular to the extending direction D61 of the first polarizer 61. In some embodiments, the first polarizer 61 may be protruded from the substrate 10.

As shown in FIG. 15B, in some embodiments, the first polarizer 61 may be embedded in the substrate 10. In some embodiments, the bottom surface of the first polarizer 61 is aligned with the bottom surface of the substrate 10.

In some embodiments, $Al_2O_3$ may be provided on the sensing chip 4 wherein $Al_2O_3$ is simulated as the analyte to be sensed, but the present disclosure is not limited thereto. Example 1 (EX1) shows the sensing chip 4 without $Al_2O_3$ and examples 2 to 11 (EX2-EX11) show the sensing chip 4 with $Al_2O_3$ having a thickness of 2, 4, 6, 8, 10, 12, 14, 16, 18, 20 nm, respectively.

Figure 16A:
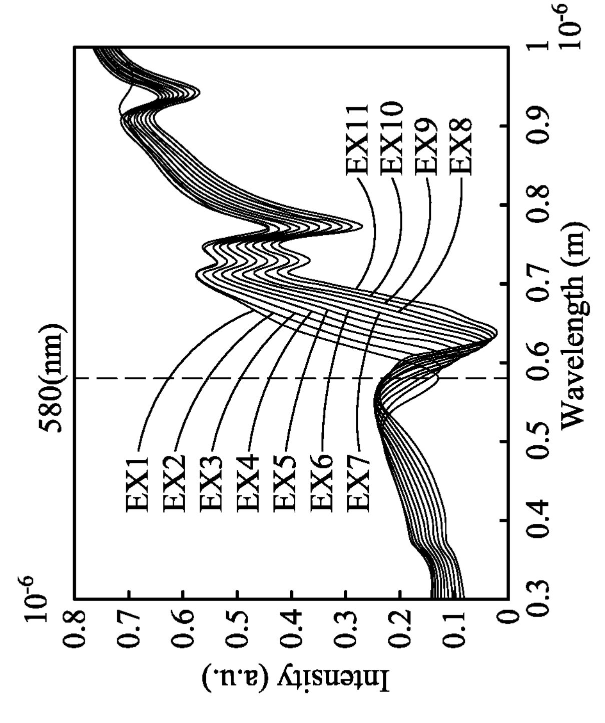
FIG. 16A is a schematic diagram illustrating a wavelength verse an intensity according to some embodiments.

Referring to FIG. 16A, it is a schematic diagram illustrating a wavelength (m) verse an intensity (a.u.) of examples 1 to 11 according to some embodiments. As shown in FIG. 16A, as the thickness of the analyte increases, the waveform is redshifted. For example, the characteristic peak is increased from under 580 nm to over 600 nm.

Figure 16B:
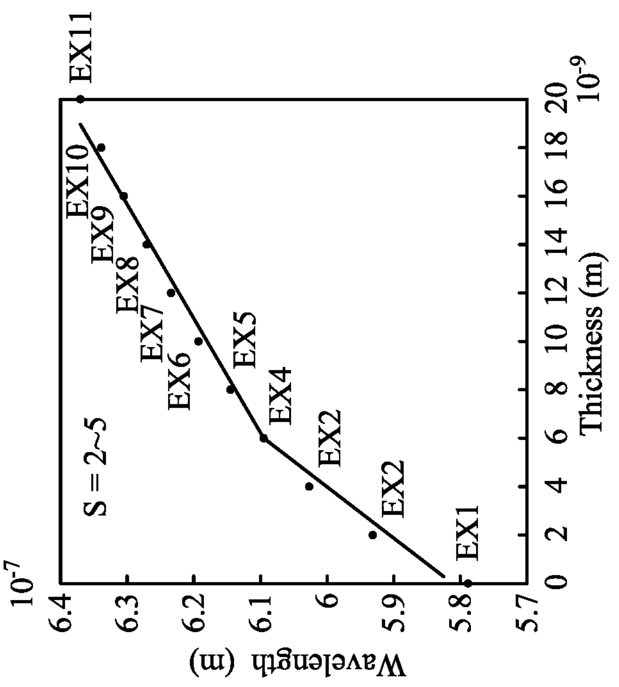
FIG. 16B is a schematic diagram illustrating a thickness verse a wavelength according to some embodiments.

Referring to FIG. 16B, it is a schematic diagram illustrating a thickness verse a wavelength according to some embodiments. The horizontal axis represents the thickness of the analyte, and the vertical axis represents the wavelength of the characteristic peak. As shown in FIG. 16B, a slope S shows the ratio of the wavelength difference to the thickness difference (the wavelength difference/the thickness difference). When the slope S is larger, the amount of wavelength shift may be clearly observed, so the greater the slope S, the greater the sensitivity. In some embodiments, the slope S may be in a range of 2 to 5. Thus, the sensitivity of the sensing structure of the present disclosure may be improved.

Accordingly, the present disclosure provides the sensing structure with specific dimensions, the sensing chip including the sensing structure, and the method for forming the sensing structure, thereby improving the sensitivity of the sensing structure.

In addition, the scope of the present disclosure is not limited to the process, machine, manufacturing, material composition, device, method, and step in the specific embodiments described in the specification. A person of ordinary skill in the art will understand current and future processes, machine, manufacturing, material composition, device, method, and step from the content disclosed in some embodiments of the present disclosure, as long as the current or future processes, machine, manufacturing, material composition, device, method, and step performs substantially the same functions or obtain substantially the same results as the present disclosure. Therefore, the scope of the present disclosure includes the abovementioned process, machine, manufacturing, material composition, device, method, and steps. It is not necessary for any embodiment or claim of the present disclosure to achieve all of the objects, advantages, and/or features disclosed herein.

The foregoing outlines features of several embodiments of the present disclosure, so that a person of ordinary skill in the art may better understand the aspects of the present disclosure. A person of ordinary skill in the art should appreciate that, the present disclosure may be readily used as a basis for designing or modifying other processes and structures for carrying out the same purposes and/or achieving the same advantages of the embodiments introduced herein. A person of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A sensing structure, comprising:

a substrate having a first recess; and a metal layer disposed on the substrate, comprising:

a first portion disposed on a top surface of the substrate; and a second portion disposed in the first recess and comprising:

a base portion; and a protruding portion disposed on the base portion and extending away from the substrate, wherein a gap is between the first portion and the protruding portion and surrounds the protruding portion, and the gap is in a range of 20 nm to 100 nm, wherein the substrate has a second recess adjacent to the first recess, and a pitch between the first recess and the second recess is in a range of 250 nm to 450 nm, wherein the pitch is greater than a width of the base portion, and the width of the base portion is in a range of 120 nm to 250 nm, and wherein the width of the base portion is greater than a width of the protruding portion, and the width of the protruding portion is in a range of 40 nm to 250 nm.

2. The sensing structure as claimed in claim 1, wherein a height of the top surface of the substrate to a bottom surface of the first recess is in a range of 20 nm to 100 nm.

3. The sensing structure as claimed in claim 1, wherein a height of the base portion is in a range of 20 nm to 100 nm.

4. The sensing structure as claimed in claim 1, wherein a height of the first portion is in a range of 20 nm to 100 nm.

5. A sensing chip, comprising:

a filter array;

a carrier layer disposed on the filter array;

a light-blocking layer disposed on the carrier layer;

a polarizer disposed on the carrier layer; and the sensing structure as claimed in claim 1 disposed on the light-blocking layer and the polarizer.

6. The sensing chip as claimed in claim 5, wherein the filter array comprises:

a first filter unit comprising a portion of a first filter and a second filter; and a second filter unit disposed adjacent to the first filter unit and comprising a remaining portion of the first filter.

7. The sensing chip as claimed in claim 6, wherein the light-blocking layer is disposed directly above a boundary between the first filter unit and the second filter unit.

8. The sensing chip as claimed in claim 6, wherein the first filter is a band pass filter with a first wavelength range, the second filter is a band pass filter or a long pass filter with a second wavelength range, and the first wavelength range overlaps the second wavelength range.

9. The sensing chip as claimed in claim 5, wherein a height of the light-blocking layer is in a range of 90 nm to 250 nm.

10. The sensing chip as claimed in claim 5, wherein a width of the light-blocking layer is in a range of 80 nm to 150 nm.

11. The sensing chip as claimed in claim 5, wherein a height of the polarizer is in a range of 90 nm to 250 nm.

12. The sensing chip as claimed in claim 5, wherein a width of the polarizer is in a range of 80 nm to 150 nm.

13. The sensing chip as claimed in claim 5, wherein the polarizer comprises a first polarizer and a second polarizer, an angle between an extending direction of the first polarizer and an extending direction of the second polarizer is 45±5°, 90±5°, or 135±5°.

* * * * *